(12) United States Patent
Levin

(10) Patent No.: US 9,189,744 B2
(45) Date of Patent: Nov. 17, 2015

(54) COUPLING OF RATIONAL AGENTS TO QUANTUM PROCESSES

(75) Inventor: Michael Levin, Swampscott, MA (US)

(73) Assignee: Mind Over Matter AI, LLC., Middleton, WI (US)

(*) Notice: Subject to any disclaimer, the term of this patent is extended or adjusted under 35 U.S.C. 154(b) by 128 days.

(21) Appl. No.: 13/252,610

(22) Filed: Oct. 4, 2011

(65) Prior Publication Data

US 2012/0084242 A1    Apr. 5, 2012

Related U.S. Application Data

(60) Provisional application No. 61/389,483, filed on Oct. 4, 2010.

(51) Int. Cl.
  *G06N 5/02* (2006.01)
  *G06N 99/00* (2010.01)
  *B82Y 10/00* (2011.01)

(52) U.S. Cl.
  CPC .............. *G06N 99/002* (2013.01); *B82Y 10/00* (2013.01)

(58) Field of Classification Search
  None
  See application file for complete search history.

(56) References Cited

U.S. PATENT DOCUMENTS

| | | | | |
|---|---|---|---|---|
| 4,058,486 A * | 11/1977 | Mallozzi et al. | | 372/5 |
| 5,408,424 A * | 4/1995 | Lo | | 708/303 |
| 5,440,670 A * | 8/1995 | Frazier | | 706/17 |
| 5,459,817 A * | 10/1995 | Shima | | 706/25 |
| 5,473,162 A * | 12/1995 | Busch et al. | | 250/341.6 |
| 5,483,620 A * | 1/1996 | Pechanek et al. | | 706/41 |
| 5,489,782 A * | 2/1996 | Wernikoff | | 250/369 |
| 5,506,797 A * | 4/1996 | Koshiba | | 708/272 |
| 5,517,596 A * | 5/1996 | Pechanek et al. | | 706/25 |
| 5,696,883 A * | 12/1997 | Arima | | 706/38 |
| 5,710,830 A * | 1/1998 | Holeva | | 382/173 |
| 5,830,064 A * | 11/1998 | Bradish et al. | | 463/22 |
| 5,860,936 A * | 1/1999 | Levin | | 600/558 |
| 6,093,153 A * | 7/2000 | Levin | | 600/558 |
| 6,862,605 B2 * | 3/2005 | Wilber | | 708/255 |
| 7,096,242 B2 * | 8/2006 | Wilber | | 708/255 |
| 7,502,763 B2 * | 3/2009 | Ayala et al. | | 706/6 |
| 7,813,822 B1 * | 10/2010 | Hoffberg | | 700/94 |
| 8,073,631 B2 | 12/2011 | Wilber | | |
| 8,130,950 B2 * | 3/2012 | Dolgunov et al. | | 380/46 |
| RE44,097 E | 3/2013 | Wilber | | |
| 8,423,297 B2 * | 4/2013 | Wilber | | 702/19 |
| 8,489,529 B2 * | 7/2013 | Deng et al. | | 706/25 |
| 2003/0153085 A1 * | 8/2003 | Leary et al. | | 436/63 |
| 2003/0209893 A1 * | 11/2003 | Breed et al. | | 280/735 |
| 2004/0128081 A1 * | 7/2004 | Rabitz et al. | | 702/23 |
| 2006/0010182 A1 * | 1/2006 | Altepeter et al. | | 708/250 |
| 2006/0224547 A1 * | 10/2006 | Ulyanov et al. | | 706/62 |

(Continued)

OTHER PUBLICATIONS

Takashi Yamada et al., "Boltzmann machine neural network devices using single-electron tunnelling," Nanotechnology 12 (2001), pp. 60-67.*

(Continued)

*Primary Examiner* — Kakali Chaki
*Assistant Examiner* — Fuming Wu
(74) *Attorney, Agent, or Firm* — Perkins Coie LLP

(57) ABSTRACT

The present invention provides devices, methods, and systems for coupling a rational agent to a quantum process. In particular, the present invention provides rational agents configured to influence a quantum process, or to derive information from a quantum process, and methods and uses thereof.

3 Claims, 26 Drawing Sheets

(56) References Cited

U.S. PATENT DOCUMENTS

| | | | |
|---|---|---|---|
| 2007/0020181 A1* | 1/2007 | Workman et al. | 424/9.1 |
| 2007/0087813 A1* | 4/2007 | Walker et al. | 463/16 |
| 2007/0094168 A1* | 4/2007 | Ayala et al. | 706/15 |
| 2008/0016013 A1* | 1/2008 | Subbu et al. | 706/13 |
| 2008/0183314 A1* | 7/2008 | Klouzal et al. | 700/90 |
| 2009/0152664 A1* | 6/2009 | Klem et al. | 257/440 |
| 2009/0265112 A1* | 10/2009 | Wilber et al. | 702/19 |
| 2010/0057653 A1* | 3/2010 | Wilber | 706/22 |
| 2010/0094765 A1* | 4/2010 | Nandy | 705/317 |
| 2010/0097381 A1* | 4/2010 | Kastrup | 345/441 |
| 2012/0084242 A1* | 4/2012 | Levin | 706/46 |
| 2013/0036078 A9 | 2/2013 | Wilber | |

OTHER PUBLICATIONS

Masamichi Akazawa, et al., "Boltzmann machine neoron circuit using single-electron tunneling," Applied Physics Letters 70, 670 (1997).*

Takashi Yamada, "Boltzmann machine neural network devices using single-electron tunnelling," Nanotechnology 12 (2001), 60-67.*

Furst et al., "High speed optical quantum random number generation," Optical Express, vol. 18, No. 2, Jun. 7, 2010.*

Beck et al., "Quantum aspects of brain activity and the role of consciousness," Proc. Natl. Acad. Sci. USA, vol. 89, pp. 11357-11361, Dec. 1992.*

International Search Report and Written Opinion for PCT/US2011/054727, mailed Apr. 30, 2012, 10 pages.

* cited by examiner

FIG. 9

Animal positive control 1: a worm

Small D. japonica worm
48 hour trial
sequence of 20 minute rest cycles, 10 minute test cycles (96 of each)
punishment ends after 300 ones are received from the byte stream
shock is 0.1 seconds
2 seconds between polls of the RNG

| Phase | Entropy | Mean | Percent Bit Flip | Chi2 P |
|---|---|---|---|---|
| pre | 7.9802 | 127.8850 | -0.001042 | 41.8744 |
| testing | 7.9874 | 126.8776 | -0.060764 | <0.01 |
| post | 7.9877 | 128.2839 | 0.001713 | 61.2732 |

FIG. 10

Animal positive control 2: a tadpole

8 min rest, 2 min test, 18 hours
shocking every 0.1 sec
lights were on for test, off for resting, off for pre & post
2 seconds between polls of the RNG
need 120 1's to turn off shock

| Phase | Entropy | Mean | Percent Bit Flip | Chi2 P |
|---|---|---|---|---|
| pre | 7.9222 | 127.8921 | -0.0013 | 89.2083 |
| resting | 7.9416 | 125.5954 | -0.0463 | 38.6741 |
| testing | 7.9277 | 129.1549 | 0.0849 | 0.2596 |
| post | 7.9011 | 125.8606 | -0.0073 | 11.6423 |

Expected by chance:
8.0 bits/byte | 128.0 (0.5 in 1 byte binary)

FIG. 11B
Sample chromosome:
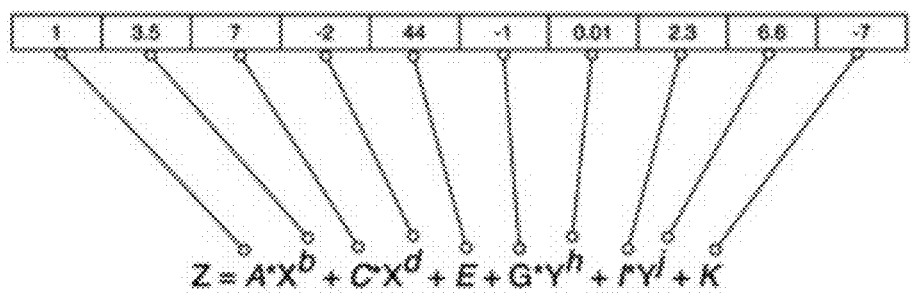
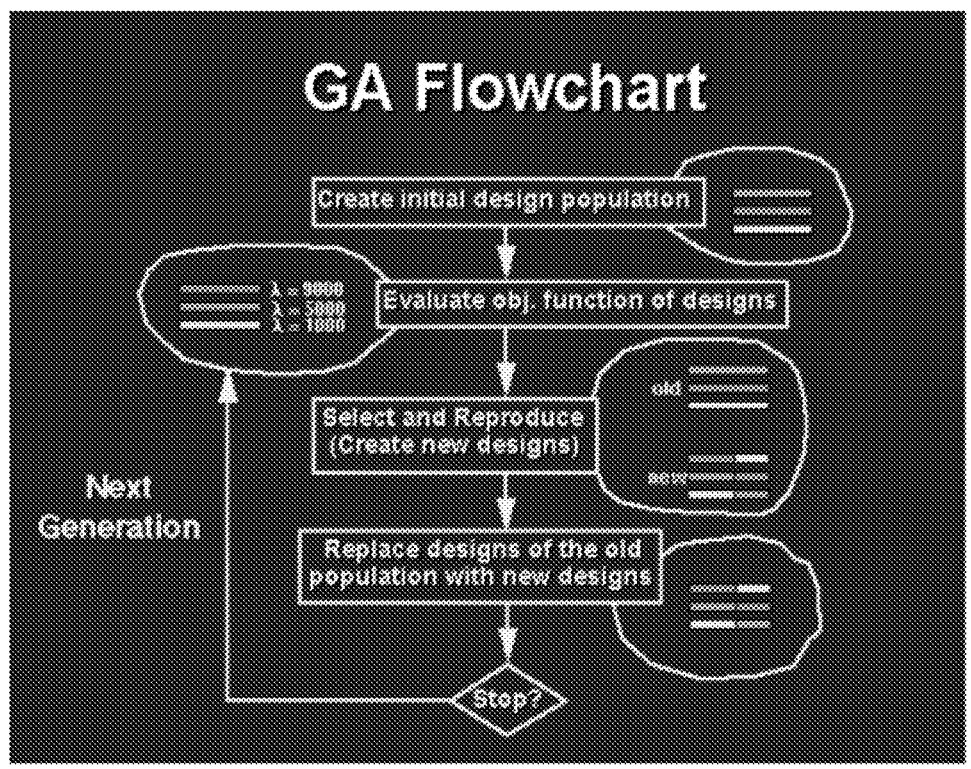

FIG. 12A

|  | Pre-Game Run | Game | Post-Game Run |
|---|---|---|---|
|  | 0.967023 | 0.997239 | 1.000000 |
|  | 0.855132 | 1.000000 | 0.760802 |
|  | 0.998330 | 0.942142 | 1.000000 |
|  | 0.792954 | 0.999083 | 0.949795 |
|  | 0.999207 | 0.924179 | 0.858482 |
|  | 0.988524 | 0.850198 | 0.990380 |
|  | 0.791234 | 0.909282 | 0.960752 |
|  | 0.961174 | 0.996075 | 0.967470 |
|  | 1.000000 | 0.997794 | 0.878018 |
|  | 1.000000 | 0.998398 | 0.983948 |
| average performance at end: | 0.935358 | 0.961439 | 0.934965 |

| Pre-Game Run | Game | Post-Game Run |
|---|---|---|
| 0.8223 | 1.0000 | 0.9852 |
| 0.9595 | 0.9644 | 0.9988 |
| 0.8244 | 0.9818 | 0.9221 |
| 0.9967 | 0.8569 | 0.9377 |
| 0.7248 | 0.7930 | 0.8289 |
| 0.9627 | 0.8706 | 0.9967 |
| 0.6957 | 0.6730 | 1.0000 |
| 0.9355 | 0.9233 | 0.9910 |
| 0.8796 | 0.9141 | 0.9918 |
| 0.9998 | 0.8565 | 0.7565 |
| 0.8712 | 0.9999 | 1.0000 |
| 1.0000 | 0.9851 | 0.9908 |
| 0.9066 | 0.6264 | 0.6324 |
| 0.3212 | 0.9821 | 0.9951 |
| 0.7390 | 0.8885 | 0.7005 |
| 0.4834 | 1.0000 | 0.2440 |
| 0.8437 | 0.9398 | 0.8031 |
| 0.2919 | 0.4043 | 0.7058 |
| 0.9677 | 0.8499 | 0.0831 |
| 0.8205 | 0.0907 | 0.0947 |

| average performance at end: | 0.8023 | 0.8300 | 0.7829 |

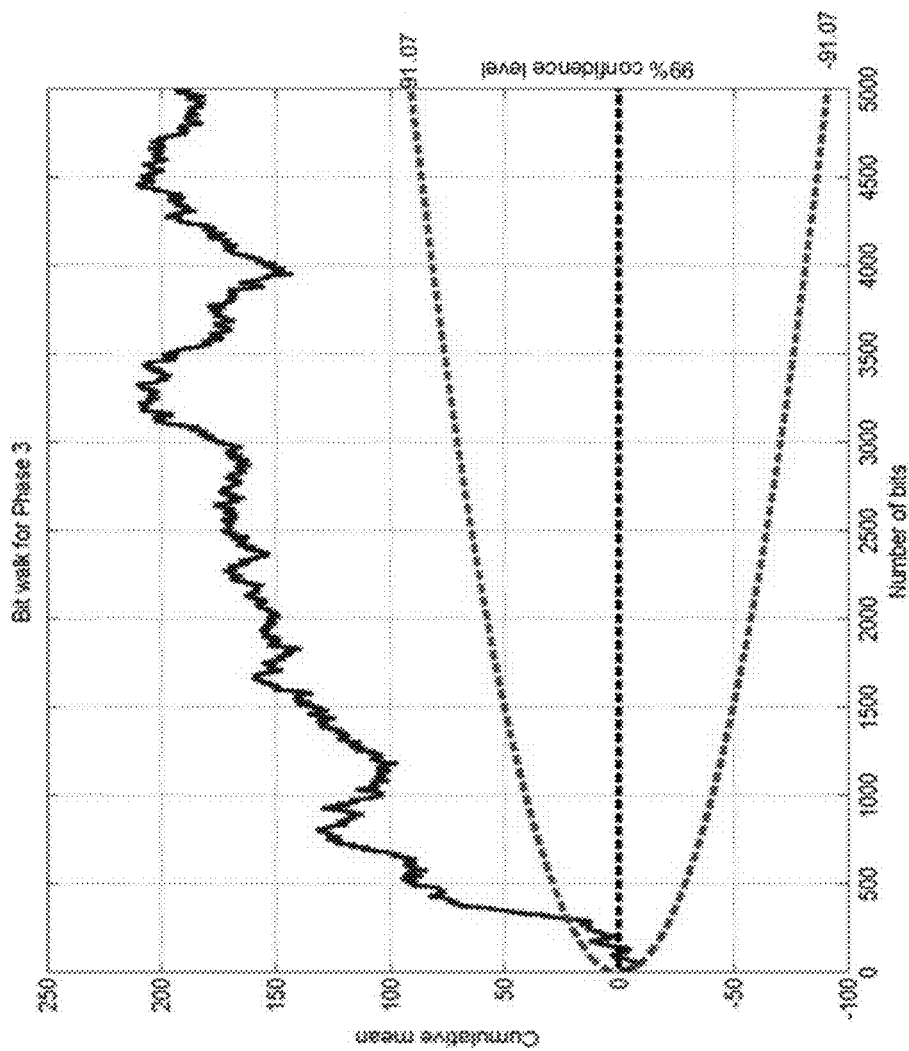

COUPLING OF RATIONAL AGENTS TO QUANTUM PROCESSES

CROSS-REFERENCE TO RELATED APPLICATION

The present application claims priority to U.S. Provisional Patent Application Ser. No. 61/389,483 filed Oct. 4, 2010, which is hereby incorporated by reference in its entirety.

FIELD OF THE INVENTION

The present invention provides devices, methods, and systems for coupling a rational agent to a quantum process. In particular, the present invention provides rational agents configured to influence a quantum process, or to derive information from a quantum process, and methods and uses thereof.

BACKGROUND OF THE INVENTION

The fields of cognitive science, neurobiology, and artificial intelligence (AI) have long sought an answer to the question of how conscious thoughts and intentional desires control a body embedded in the physical world. This is the mind-body problem: how does conscious Will affect the quantum processes controlling neuronal activity in the brain (e.g. synaptic vesicle release, etc.) to produce behavior consistent with the intent? Because the macroscopic world is deterministic, the model necessarily posits that a Mind can interact with matter, without violating conservation of energy principles, only by manipulating the fundamentally-random (acausal) processes at the level of quantum mechanics (Larmer, 1986; Morowitz, 1987; Penrose, 1996; herein incorporated by reference in their entireties). A model of this process has been developed wherein conscious intent not only affects the behavior of particles inside a brain, but also affects quantum events outside the brain (Herman and Walker, 1972; Jahn and Dunne, 1986; Jibu and Yasue, 1995; Schwartz et al., 2005; Stapp, 1993; Stapp, 1999; herein incorporated bu reference in their entireties). Such experiments use a device known as a quantum random number generator (qRNG). A qRNG is a device that uses quantum-mechanical events, which are in principle unpredictable and thus not physically determined to produce a stream of random bits (e.g. a stream of 1's and 0's). It has been demonstrated that conscious intent of a human subject or animal can deviate the statistical distribution of the qRNG's output. An extensive body of work and statistical analysis demonstrate that a human or animal operator can deviate the output of a calibrated qRNG (e.g., cause it to produce more 1's than it otherwise would produce). (Franklin et al., 2005; Jahn et al., 1997; Peoch, 1988; Peoch, 1995; Schmidt, 1971; herein incorporated by reference in their entireties).

In quantum mechanics, wave function collapse (also called collapse of the state vector or reduction of the wave packet) is the phenomenon in which a wave function, initially in a superimposition of several different possible eigenstates, appears to reduce to a single one of those states after interaction with an observer. It is the reduction of the physical possibilities into a single possibility as seen by an observer (J. von Neumann (1955). *Mathematical Foundations of Quantum Mechanics*. Princeton University Press; herein incorporated by reference in its entirety.). A branch of quantum mechanics posits that the consciousness of an observer is the demarcation line that precipitates collapse of the wave function, independent of any realist interpretation. Commonly known as "consciousness causes collapse", this interpretation of quantum mechanics states that observation by a conscious observer is what makes the wave function collapse. The interpretation identifies the non-linear probabilistic projection transformation that occurs during measurement with the selection of a definite state by a mind from the different possibilities that it could have in a quantum mechanical superposition. In other words, creatures' minds somehow cause microscopic-scale probabilities to become reality. Such an interpretation follows strict predictable laws—it can be studied, and tamed (e.g., as inventions like CD players demonstrate) by appropriate technology, despite the lack of understanding of the mechanisms that underlie it (as is true for much of quantum mechanics).

In using human or animal subjects, the experimenter has very little control over the functioning of this complex intentional system (a biological mind-brain). Because of the ethical impossibility of making radical changes in human consciousness, and the lack of current knowledge about relevant aspects of brain/mind function, scientists have been unable to determine precisely what aspects of information processing, or other events, in their living subjects enable interfacing to quantum-mechanical processes in the real world. Moreover, because of these difficulties and the fundamental uniqueness of all biological forms (which prevents parallelizing the effect to increase its power because individual animals' influences cancel out and are not simply additive), useful applications of this effect have not been produced.

SUMMARY OF THE INVENTION

In some embodiments, the present invention provides systems comprising: (a) an amplified quantum process; and (b) an rational agent; wherein the rational agent is configured to make a selection between two or more choices; wherein the selection is at least partially based upon output from the amplified quantum process; and wherein the rational agent exerts intent on the amplified quantum process, thereby altering the output of the amplified quantum process. In some embodiments, the intent comprises intent to select a specific choice and/or a choice that produces a specific outcome. In some embodiments, the rational agent is capable of ranking the choices according to their desirability to the rational agent. In some embodiments, the intent of the rational agent increases the likelihood of the rational agent selecting a more desirable choice. In some embodiments, the rational agent is incapable of ranking choices according to the desirability. In some embodiments, the intent of the rational agent increases the likelihood of the artificial intelligence agent selecting a more desirable outcome. In some embodiments, the rational agent is selected from: a decision-making computer program; virtual ecology; neural network; genetic algorithm; cellular automation; distributed agent system; optimization system; learning system; natural language processing engine; semantic processing system; probabilistic classifier; Boltzmann machine; a biological agent; or a ecological, social, economic, or cellular simulation system. In some embodiments, the amplified quantum process is selected from: biological systems, quantum random number generators, detectors of radioactivity, superconductive devices, amplifiers of quantum electronics effects, and systems that depend on many choices made by populations. In some embodiments, the output from the amplified quantum process is provided as a binary bitstream. In some embodiments, the rational agent is not an intact human or animal.

In some embodiments, the rational agent is capable of ranking choices and/or outcomes according to their desirability (e.g., optimal, second most desirable . . . third . . .

fourth . . . least desirable, etc.). In some embodiments, the rational agent is incapable of ranking choices and/or outcomes according to their desirability (e.g., optimal, second most desirable . . . third . . . fourth . . . least desirable, etc.). In some embodiments, a rational agent is one capable of ranking choices or outcomes according to desirability after the selection has been made, and/or other steps and/or events have occurred (e.g., the correct next move in poker may be unknowable at the time a hand must be played, but becomes apparent after the hand).

In some embodiments, the present invention provides methods of influencing a quantum process comprising: (a) providing: (i) a quantum process; and (ii) an rational agent, wherein the rational agent is dependent upon output of the quantum process to perform a task, and wherein the rational agent has intent to perform the task to achieve an outcome; (b) exerting the intent of the rational agent on the quantum process, wherein the intent of the rational agent influences the quantum process to provide output that will allow the rational agent to perform the task to achieve the outcome; (c) providing output from the quantum process to the rational agent; and d) performing the task by the rational agent. In some embodiments, the output comprises two or more types of bits, and wherein the rational agent's performance at the task varies according to the type of bit provided to the rational agent. In some embodiments, the rational agent is aware of one or more of (i) which type of bit will result in the rational agent achieving the outcome, or (ii) which action will result in the rational agent achieving the outcome. In some embodiments, the rational agent is unaware of one or more of (i) which type of bit will allow in the rational agent achieving the outcome, or (ii) which action will result in the rational agent achieving the outcome. In some embodiments, the intent of the rational agent alters the output of the quantum process. In some embodiments, the quantum process is selected from: biological systems, quantum random number generators, detectors of radioactivity, superconductive devices, amplifiers of quantum electronics effects, and systems that depend on many choices made by populations. In some embodiments, the rational agent is not an intact human or animal.

In some embodiments, the present invention provides systems comprising: (a) an amplified quantum process; and (b) a rational agent, wherein the rational agent is not an intact human or animal; wherein the rational agent is configured to make a selection between two or more choices and the rational agent is unable to determine which of the choices is optimal; wherein the selection is at least partially based upon output from the amplified quantum process; wherein the goal-seeking agent exerts intent on the amplified quantum process; and wherein the amplified quantum process supplies the rational agent with output that increases the likelihood of the rational agent selecting the optimal choice. In some embodiments, the amplified quantum process supplies the rational agent with output that results in the rational agent selecting the optimal choice. In some embodiments, the output comprises two or more types of bits, and the choice is made by the rational agent based on the identity or pattern of bits supplied by amplified quantum process. In some embodiments, the rational agent is unaware of one or more of (i) which type of bit or pattern of bits will result in the rational agent selecting the optimal choice, or (ii) which choice is the optimal choice. In some embodiments, the quantum process is selected from: biological systems, quantum random number generators, detectors of radioactivity, superconductive devices, amplifiers of quantum electronics effects, and systems that depend on many choices made by populations. In some embodiments, the rational agent is selected from: a decision-making computer program; virtual ecology; neural network; genetic algorithm; cellular automation; distributed agent system; optimization system; learning system; natural language processing engine; semantic processing system; probabilistic classifier; Boltzmann machine; biological agent; or a ecological, social, economic, or cellular simulation system.

In some embodiments, the present invention provides methods for identifying agents capable of intent comprising: (a) providing: (i) a quantum process, wherein the quantum process produces a detectable output; (ii) a test agent, wherein the test agent is configured to depend upon the detectable output of the quantum process to make a decision between 2 or more outcomes; (b) allowing the test agent to receive the output from the quantum process wherein the test agent does not provide feedback to the quantum process; (c) detecting test output from the quantum process during and/or following decision making by the test agent; (d) comparing the test output from the quantum process with a control output; and (e) identifying the test agent as capable of intent if the test output differs from the control output. In some embodiments, the control output comprises output from the quantum process detected prior to and/or in the absence of decision making by the test agent. In some embodiments, the control output comprises output from a non-quantum process detected during and/or following decision making by the test agent. In some embodiments, the test agent comprises a decision-making computer program, virtual ecology, neural network, genetic algorithm, cellular automation, distributed agent system, optimization system, learning system, natural language processing engine, semantic processing system, probabilistic classifier, Boltzmann machine, or a simulation system; and wherein the quantum process is amplified or manifested by a random number generator, biological system, iterative process, cybernetic control network, the weather, or a market.

In some embodiments, the present invention provides a system comprising: (a) a quantum process; and (b) an artificial intelligence agent; wherein the artificial intelligence agent is configured to make a selection; wherein the selection is between two or more outcomes of variable desirability; wherein the selection is based upon output from the quantum process; and wherein the artificial intelligence agent exerts influence on the quantum process, thereby altering the output of the quantum process, and increasing the likelihood of the artificial intelligence agent selecting a more desirable outcome. In some embodiments, the output of a quantum process is an input for an artificial intelligence agent. In some embodiments, a quantum system is provided which depends on the outcome of a quantum-mechanical process. In some embodiments, the outcomes and/or decisions of the quantum system depend upon quantum-mechanical processes. In some embodiments, in the quantum system the outcome of a quantum-mechanical process is repeatedly amplified and presented as a stream of random digits. In some embodiments, the quantum-mechanical process is repeatedly amplified. In some embodiments, the quantum-mechanical process is presented as a stream of random digits (e.g., binary output, 1's and 0's, etc.). In some embodiments, the quantum-mechanical process is selected from a list consisting of one or more of: biological systems (e.g., cells, tissues, or organisms in which behavior can be modified by quantum effects (e.g., at ion channels in the cell membrane and/or at the cytoskeleton)), random number generators (e.g., qRNG), detectors of radioactivity, superconductive devices, devices that detect/amplify Johnson noise and other quantum electronics effects, and systems that depend on many choices made by large numbers of biological agents (e.g., population dynamics in animal populations, bacteria, or cultured cells, stock market, functioning of neural networks, behavior of human subjects in situations such as driving, consumer decision-making (choosing among similar products), media consumption (e.g., selecting from among several equally probably viewing options on cable or internet websites), etc.). In some embodiments, the influence on a physical manifestation of a quantum process is observable when the system is poised among several equiprobable outcomes (or nearly equiprobable). In some embodiments, when there is a strong internal preference for one outcome, the influential effect on the physical manifestation of a quantum process is likely unobservable. In some embodiments, when outcomes are of roughly equal probability systems can be pushed towards one of those outcomes by very small "nudges" which are observable because the nudges result in a shift in the outcome. In some embodiments, the output from the quantum process is reported by a qRNG. In some embodiments, the qRNG output is a binary bitstream. In some embodiments, altering the output of the quantum process increases the likelihood of the artificial intelligence agent selecting the most desirable outcome. In some embodiments, the artificial intelligence agent comprises the intent to achieve more desirable outcomes. In some embodiments, the quantum mechanical process is manifested by a biological system. In some embodiments, the biological system comprises a human, an animal, a group of organisms, an in vitro homeostatic biological system, a plant, bacteria, or a fungus. In some embodiments, the artificial intelligence agent comprises a device, system, software, hardware, and/or process. In some embodiments, the artificial intelligence agent comprises a decision-making computer program; virtual ecology; neural network; genetic algorithm; cellular automation; distributed agent system; optimization system; learning system; natural language processing engine; semantic processing system; probabilistic classifier; Boltzmann machine; or a ecological, social, economic, or cellular simulation system. In some embodiments, the artificial intelligence agent comprises an algorithm. In some embodiments, the algorithm is performed on a digital device and/or computer. In some embodiments, the algorithm is implemented as an analog device. In some embodiments, the algorithm performs different actions and/or makes decisions (e.g., at points in time) depending on input from a random bitstream (e.g., quantum bitstream, not pseudo-random). In some embodiments, the algorithm is selected from a list consisting of one or more of: games, optimization tasks, sorting, detection algorithms, cryptography algorithms, real-time process control algorithms, algorithms that solve specific equations, parameter fitting tasks, feature extraction and identification algorithms, and any useful computation where decisions need to be made.

In some embodiments, the present invention provides a system comprising a component that acts according to an algorithm and a quantum process, wherein the algorithm is dependent upon the quantum process for input to make a decision (e.g., repeated decisions). In some embodiments, when the algorithm (or algorithm-dependent component) must make the decision, a bit is obtained by amplifying a quantum process (e.g., biologically or electronically) into an observable outcome. In some embodiments, the observable outcome is displayed as, or converted into, a 0 or 1. In some embodiments, the algorithm (or algorithm-dependent component) selects between possible choices (e.g., 2 choices, more than 2 choices) based on the bit (e.g., 1 or 0) provided by or drawn from the quantum process. In some embodiments, the algorithm (or algorithm-dependent component) uses the bit obtained from the quantum process to provide a better-than-average performance where otherwise a random choice would have been made (e.g., the algorithm (or algorithm-dependent component) has insufficient information to make a better choice using traditional computation). In some embodiments, the bit is used to force the algorithm (or algorithm-dependent component) to make the known best decision (or conversely a known sub-optimal decision) generating an intention on the part of the algorithm (or algorithm-dependent component) to push the bitstream towards bits that allow it to use the best (or sub-optimal) options. In some embodiments, the output of the quantum process (e.g., bitstream) is deviated away from the statistically-expected random outcome by its use by the algorithm (or algorithm-dependent component). In some embodiments, the output of the quantum process (e.g., bitstream) is deviated away from the statistically-expected random outcome by the intention of the algorithm (or algorithm-dependent component). In embodiments in which the quantum process arises from a physical process (e.g., behavior of a dynamical or living system), the physical process is deviated along with the underlying quantum process (e.g., in accordance with the intention being exerted on the bitstream).

In some embodiments, the present invention provides a method of influencing a quantum bitstream comprising: (a) providing: (i) a quantum bitstream; and (ii) an artificial intelligence agent, wherein the artificial intelligence agent makes decisions between multiple outcomes of varying desirability to the artificial intelligence agent; and wherein the decision making is based in part on the quantum bitstream; (b) allowing the artificial intelligence agent to make decisions between the outcomes based on the quantum bitstream. In some embodiments, the method further comprises (c) detecting changes in the quantum bitstream during or following the decision making. In some embodiments, the quantum bitstream comprises and/or is observed (detected, received, etc.) by the artificial intelligence agent as a binary time series. In some embodiments, the quantum bitstream comprises a binary time series (e.g., produces and/or outputs 2 types of bits). In some embodiments, upon drawing a first type of bit from the quantum bitstream (e.g., 0 or 1), the artificial intelligence agent selects a desirable outcome (e.g. perceived optimal outcome, best-known outcome, etc.), and upon drawing a second type of bit (e.g, 1 or 0), the artificial intelligence agent selects a less desirable outcome. In some embodiments, upon allowing the artificial intelligence agent to make decisions between the outcomes based on the quantum bitstream, the artificial intelligence agent influences the quantum bitstream to produce a greater proportion of the first type of bit (e.g., 0 or 1) over the second type of bit (e.g., 1 or 0). In some embodiments, the quantum bitstream is provided by any system in which the outcome of a quantum-mechanical process is repeatedly amplified and presented as a stream of random digits (e.g., biological systems, quantum random number generators, detectors of radioactivity, superconductive devices, devices that detect/amplify Johnson noise and other quantum electronics effects, systems that depend on many choices made by large numbers of biological agents (e.g., population dynamics, stock market), etc.). In some embodiments, the quantum bitstream comprises the output of a quantum random number generator. In some embodiments, the output of the quantum random number generator comprises a binary time series. In some embodiments, upon drawing a first type of bit from the quantum random number generator, the artificial intelligence agent selects a desirable outcome (e.g. perceived desirable outcome, perceived optimal outcome, best-known outcome, etc.), and upon drawing a second value of bit, the artificial intelligence agent selects a less desirable outcome. In some embodiments, upon allowing the artificial intelligence agent to make decisions between the outcomes based on the quantum bitstream, the artificial intelligence agent influences the quantum bitstream to produce a greater proportion of the first type of bit over the second type of bit. In some embodiments, the first type of bit and the second type of bit comprise 1 and 0. In some embodiments, upon drawing a 0 from the quantum random number generator, the artificial intelligence agent selects a highly desirable outcome, and upon drawing a 1, the artificial intelligence agent selects a less desirable outcome. In some embodiments, upon allowing the artificial intelligence agent to make decisions between the outcomes based on the quantum bitstream, the artificial intelligence agent influences the quantum bitstream to produce a greater proportion of 0's over 1's. In some embodiments, upon drawing a 0 from the quantum random number generator, the artificial intelligence agent selects a highly desirable outcome, and upon drawing a 1, the artificial intelligence agent selects a less desirable outcome. In some embodiments, upon allowing the artificial intelligence agent to make decisions between the outcomes based on the quantum bitstream, the artificial intelligence agent influences the quantum bitstream to produce a greater proportion of 0's over 1's. In some embodiments, the artificial intelligence agent comprises intent.

In some embodiments, the present invention provides a method for identifying agents capable of intent comprising: (a) providing: (i) a quantum process, wherein the quantum process produces a detectable output; and (ii) a test agent, wherein the test agent is configured to depend upon output from the quantum process to make a decision between two or more outcomes, wherein the outcomes are ranked by desirability; (b) connecting the test agent to the quantum process; (c) detecting output from the quantum process in the absence of decision making by the test agent; (d) detecting output from the quantum process during and/or following decision making by the test agent; and (e) comparing outputs from steps (c) and (d). In some embodiments, a change in output during and/or following decision making (e.g. a decision-making phase, a single decision, a series of decisions) by the test agent compared to output in the absence of decision making by the test agent indicates the test agent comprises intention. In some embodiments, the absence of a change in the output during and/or following decision making by the test agent compared to output in the absence of decision making by the test agent indicates the test agent lacks intention. In some embodiments, the present invention provides a method for identifying agents capable of intent comprising: (a) providing: (i) a quantum process, wherein the quantum process produces a detectable output; and (ii) a test agent, wherein the test agent is configured to depend upon output from the quantum process to make a decision between two or more outcomes, wherein the outcomes are ranked by desirability; (b) connecting the test agent to the quantum process, wherein connecting allows the test agent to receive output from the quantum process, but the agent does not provide feedback through the connection to the quantum process; (c) detecting output from the quantum process in the absence of decision making by the test agent; (d) detecting output from the quantum process during and/or following decision making by the test agent; and (e) comparing outputs from steps (c) and (d). In some embodiments, a change in output during and/or following decision making (e.g. a decision-making phase, a single decision, a series of decisions) by the test agent compared to output in the absence of decision making by the test agent indicates the test agent comprises intention. In some embodiments, the absence of a change in the output during and/or following decision making by the test agent compared to output in the absence of decision making by the test agent indicates the test agent lacks intention. In some embodiments, the test agent comprises a device, system, software, hardware, and/or process. In some embodiments, the artificial intelligence agent comprises a decision-making computer program; virtual ecology; neural network; genetic algorithm; cellular automation; distributed agent system; optimization system; learning system; natural language processing engine; semantic processing system; probabilistic classifier; Boltzmann machine; or a ecological, social, economic, or cellular simulation system. In some embodiments, the quantum process is amplified or manifested by a qRNG, or biological system, an iterative process, a cybernetic control network, the weather, or a market.

In some embodiments, the present invention provides a method for identifying agents capable of intent comprising: (a) providing a test agent, wherein the test agent is configured to depend upon a bitstream to select between 2 or more outcomes, wherein the outcomes are ranked by desirability; (b) allowing said test agent to select outcomes using a quantum bitstream; (c) allowing the test agent to select outcomes using a pseudo-random bitstream; (d) comparing the desirability of the outcomes from steps (b) and (c). In some embodiments, the increased desirability of outcomes from step (b) indicates said test agent is capable of intent. In some embodiments, the quantum bitstream is output from a qRNG. In some embodiments, the bitstream comprises a binary time series, base 10 time series, or real number time series. In some embodiments, the agent comprises a decision-making computer program; virtual ecology; neural network; genetic algorithm; cellular automation; distributed agent system; optimization system; learning system; natural language processing engine; semantic processing system; probabilistic classifier; Boltzmann machine; or a ecological, social, economic, or cellular simulation system.

In some embodiments, the present invention provides a system comprising: (a) a quantum process; and (b) an artificial intelligence agent; wherein the artificial intelligence agent is configured to make a selection between outcomes; wherein the outcomes have varying degrees of desirability, but the artificial intelligence agent is at least partially unable to determine which outcome or outcomes are more desirable; wherein the artificial intelligence agent bases the selection upon output from the quantum process. In some embodiments, the artificial intelligence agent is completely unable to determine which outcome or outcomes are more desirable. In some embodiments, the input the quantum process provides increases the likelihood of the artificial intelligent agent selecting a more desirable outcome. In some embodiments, the quantum process increases the likelihood of the artificial intelligent agent selecting a more desirable outcome. In some embodiments, the more desirable outcome comprises the most desirable outcome. In some embodiments, the likelihood is increased over random chance. In some embodiments, the quantum process is amplified, or manifested by a qRNG, or biological system, an iterative process, a cybernetic control network, the weather, or a market. In some embodiments, the agent comprises a decision-making computer program; virtual ecology; neural network; genetic algorithm; cellular automation; distributed agent system; optimization system; learning system; natural language processing engine; semantic processing system; probabilistic classifier; Boltzmann machine; or a ecological, social, economic, or cellular simulation system. In some embodiments, the quantum process provides information to the artificial intelligence agent to increase the likelihood of the artificial intelligent agent selecting a more desirable outcome. In some embodiments, outcomes vary in desirability to the artificial intelligence agent based on any suitable criteria. In some embodiments, desirability to an artificial intelligence agent includes one or more of: finishing a task correctly, finishing a task quickly, prolonging the time spent performing a task, being provided more difficult tasks to perform, being provided specific kinds of tasks, being allowed to interact with specific kinds of input data, being allowed to interact with other specific kinds of AIAs, having the opportunity to influence a real-world event (e.g., physical effector or output mechanism), processing more information, optimizing some process (e.g., virtual/simulated or physical), allowing more copies of itself to be made and executed, or having its memory/capacity/speed expanded, increasing/decreasing entropy of a specific process or data stream.

In some embodiments, the present invention provides a self-optimizing system, comprising: (a) providing: (i) a quantum bitstream; and (ii) an agent, wherein the agent performs a task, wherein the task can be performed at optimal or suboptimal levels, wherein performance of the task is dependent upon output from the bitstream, and wherein the agent has the goal of performing the task well; (b) allowing the agent to perform the task, wherein, in performing the task, the agent exerts influence upon the bitstream to alter the output of the bitstream, thereby optimizing the performance of the agent.

DESCRIPTION OF THE DRAWINGS

FIG. 9 shows data from a control experiment demonstrating the ability of a test system to detect influence exerted by an animal (*D. japonica* worm).

FIG. 10 shows data from a control experiment demonstrating the ability of a test system to detect influence exerted by an animal (tadpole).

DEFINITIONS

Figure 1:
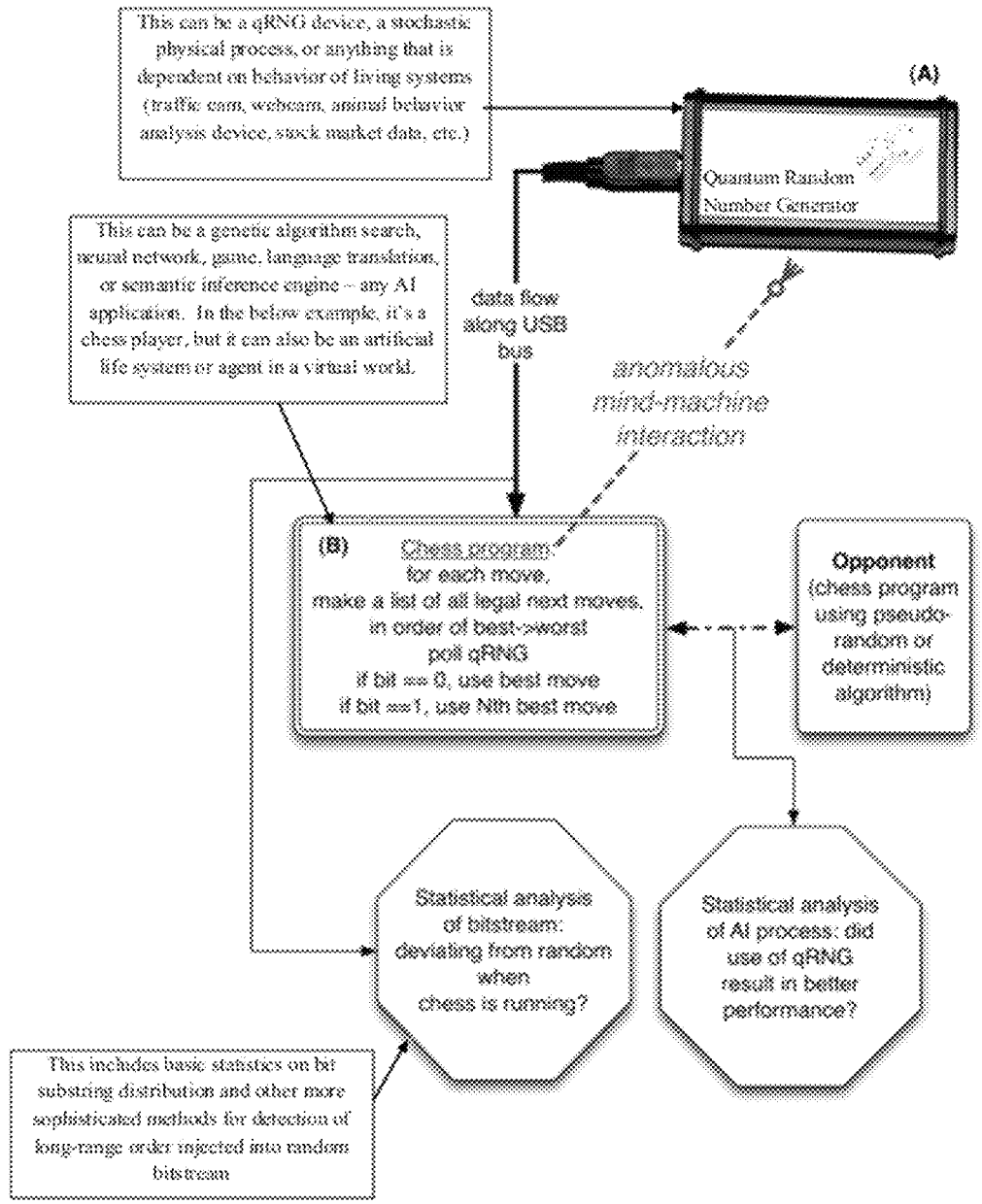
FIG. 1 shows a schematic representation of an embodiment of the present invention in which an AIA exerts influence on a quantum process resulting in altered output from a physical process (e.g. qRNG).
Figure 2:
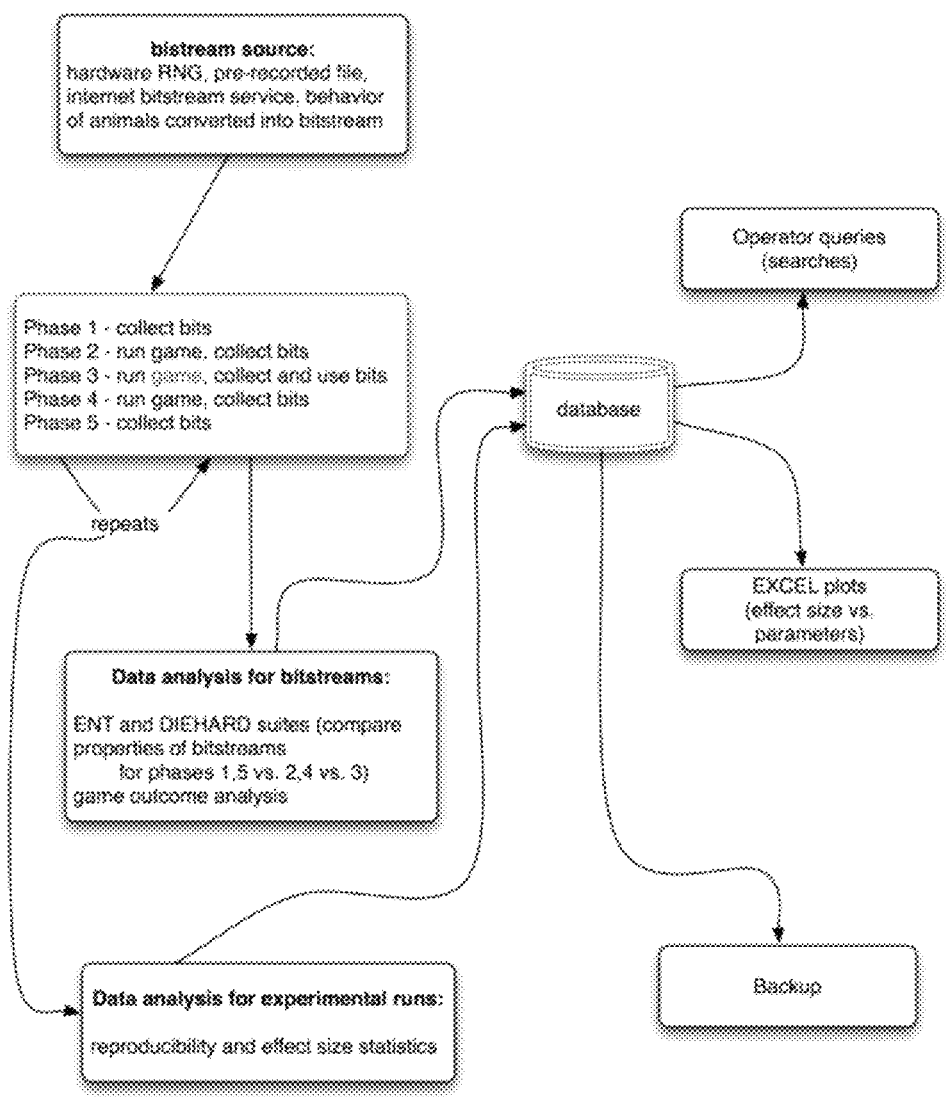
FIG. 2 shows a schematic representation of an experiment to test for an agent's capacity to exert influence on a bitstream, and more broadly, a system of hardware and software for the investigation of this novel effect, which can be used with numerous types of quantum bit sources and AIAs to determine the optimal parameters of this effect and harness it for useful applications.

As used herein, the terms "intelligent agent" ("IA"), "goal-seeking agent", and "rational agent" are used synonymously and refer to any cohesive system or entity that has preferences and/or directs its activity towards achieving goals. An IA, rational agent, or goal-seeking agent processes information and makes decisions based on their environment, whether virtual or physical. An IA, rational agent, or goal-seeking agent makes choices and/or performs actions that result in the optimal outcome for itself from among all feasible actions, according to the goals of the agent. IAs can also be viewed as dynamical systems that process information and attempt to maintain their state within a specific attractor in some appropriate state space. An intelligent agent may be a human or animal, a group of humans or animals, an in vitro homeostatic biological system (e.g. cells, tissues, or cultured organs), a hybrid (cybernetic) construct of bioengineering, an artificial intelligence agent (AIA), or a semi-artificial intelligent agent.

As used herein, the term "artificial intelligence agent" refers to non-living device, process, or system capable of, or configured to, direct activities toward achieving goals (e.g. solving problems, achieving goal states, processing information, carrying out algorithmic computation, etc.). An AIA can be a purely-software system (e.g. an algorithm itself), a piece of hardware (e.g. robot, whether explicitly programmed or not), or a combined software-hardware system, possibly including biological components (as defined in the fields of Bioengineering, Synthetic Biology and Artificial Life).

As used herein, the term "semi-artificial intelligence agent" refers to an agent comprising a non-living process, device, or system coupled to a living organism (e.g. human, animal, etc.) or group of organisms (e.g. bacteria culture), wherein the coupled group is capable of, or configured to, direct activities toward achieving goals (e.g. solving problems, achieving goal states, etc.).

As used herein, the term "rationality" refers to the desire for more rather than less good, where "good" is defined as maximizing some quantity or condition. Rationality is manifest by any dynamical system (physically embodied or purely simulated) that processes information in a manner directed at achieving goals, solving a problem, or optimizing performance.

As used herein, the term "influence" refers to the capacity or power of an entity (e.g. agent, process, person, animal, device, composition, etc.) to compel the actions, behaviors, and/or thoughts of a second entity. The first entity may force the actions of a second entity, or may cause some degree of deviation in the second entity's actions. The first entity may alter outcomes produced by the second entity.

As used herein, the term "intent" refers to the goals and/or desires of an intelligent agent. Humans and animals, as well as true artificial intelligence agents, exhibit "intent" to achieve their goals. The intelligent agent need not be aware of the existence of its "intent." Dynamical systems (whether physical or simulated) have intent to achieve particular goal states if their functioning is set up in such a way as to tend towards some attractor(s) in a particular state space. A system's intent may also be a homeostatic tendency to preserve its state or cohesiveness, or to maximize some specific quantity.

As used herein, the term "intact" refers to an entity, agent, or system that is complete or whole. For example and "intact human" refers to a complete human being, not merely cells, tissues, or organs derived therefrom.

DETAILED DESCRIPTION OF THE INVENTION

The present invention provides a systems, methods, and devices comprising an intelligent agent and a quantum process. The present invention provides devices, methods, and systems for coupling an intelligent agent to a quantum process. The present invention provides methods, devices, and systems for exerting influence on quantum systems, devices, or processes. In some embodiments, an intelligent agent influences and/or alters the output and/or behavior of a quantum process, or physical processes dependent thereon. The present invention is not limited to any particular mechanism of influencing a quantum process, and an understanding of the mechanism of action is not necessary to practice the present invention. In some embodiments, the present invention provides methods and systems wherein an intelligent agent (e.g. artificial intelligence agent or a biological system) exerts influence (e.g., through the intent of the IA) on a quantum process and/or system, or an amplifier thereof. In some embodiments, an intelligent agent derives information from a quantum process (e.g. bitstream). In some embodiments, the present invention provides artificial intelligence agents (AIAs) configured to influence a quantum process, and methods and uses thereof. In some embodiments, the present invention provides intelligent agents (e.g. AIAs) configured to influence a quantum bitstream, and methods and uses thereof. In some embodiments, the present invention provides intelligent agents (e.g. AIAs) which obtain an advantage in performing a task, answering a question, making a decision, choosing between options, selecting an outcome, etc. by deriving information from a quantum bitstream. In some embodiments, an AIA exerts influence on a quantum bitstream and derives information from the bitstream in order to solve a problem, perform a task, answer a question, make a decision, choose between options, select an outcome, etc. Many embodiments herein are described in terms of an AIA; however, a skilled artisan will understand that the embodiments described throughout also apply to other rational agents, systems and entities.

In some embodiments, the present invention provides a transformation of the intent of an rational agent into usable information contained within a bitstream (e.g. in the form of alteration of the bitstream). In some embodiments, usable information contained within the bitstream is manifested as enhanced performance of the rational agent. In some embodiments, the present invention provides processes for transforming the intentions of an rational agent into enhanced performance of the rational agent. In some embodiments, the transformation of intention into enhanced performance occurs via influence on, and/or alteration of, quantum mechanical processes, or physical processes reliant upon quantum processes for function. In some embodiments, usable information from a bitstream coupled to a rational agent (e.g., AIA) is derived from a statistical analysis of the bitstream data. In some embodiments, the present invention alters the output of a physical process (e.g. a physical process which depends upon a quantum effect) in a measurable, detectable, and/or reportable manner.

In some embodiments, an intelligent agent (IA) is an artificial intelligence agent (AIA). In some embodiments, an IA (e.g. AIA) is capable of directing activities toward achieving a goal or goals. In some embodiments, an IA (e.g. AIA) is configured to direct activities toward achieving a goal and/or objective. In some embodiments, an IA (e.g. AIA) selects between multiple states (e.g. goal and non-goal states, states along a continuum of desirability, multiple goal and multiple lesser states, etc.) with the intent of selecting a more optimal state. In some embodiments, it is the intent (e.g. conscious intent or goal state) of an IA (e.g. AIA) to achieve a goal state. In some embodiments, it is the intent of an IA (e.g. AIA) to achieve a more desirable state. In some embodiments, it is the intent (e.g. conscious intent) of an IA (e.g. AIA) to achieve the most desirable state. In some embodiments, it is the intent (e.g. conscious intent) of an IA (e.g. AIA) to select a goal or desirable state over a non-goal or less desirable state. In some embodiments, it is the intent (e.g. conscious intent) of an IA (e.g. AIA) to achieve a desirable result. In some embodiments, it is the intent (e.g. conscious intent) of an IA (e.g. AIA) to achieve a more desirable result. In some embodiments, it is the intent of an IA (e.g. AIA) to achieve the most desirable result. In some embodiments, it is the intent of an IA (e.g. AIA) to select a goal or desirable result over a non-goal or less desirable result. In some embodiments, it is the intent of an IA (e.g. AIA) to select the most desirable outcome from a set of outcomes. In some embodiments, it is the intent of an IA (e.g. AIA) to increase to desirability of an outcome. In some embodiments, it is the intent of an IA (e.g., AIA) to act with rationality. In some embodiments, an IA acts with rationality, to increase to desirability of an outcome, to select a goal or desirable result over a non-goal or less desirable result, to achieve a more desirable state, to achieve the most desirable state, to achieve a goal state, etc. In some embodiments, an IA is capable of ranking several outcomes (e.g., 2 or more) according to their respective desirability. In some embodiments, an IA is unaware of the respective desirability of several outcomes (e.g., 2 or more). In some embodiments, despite being incapable of ranking several outcomes according to desirability, the IA still desires to select or achieve a more desirable (e.g., the most desirable) outcome.

In some embodiments, an IA (e.g., AIA) is a goal-directed system. In some embodiments, an AIA has intention. In some embodiments, an IA (e.g., AIA) is a process which selects between two outcomes and seeks to select the more desirable outcome. In some embodiments, an IA (e.g., AIA) is a process which selects between multiple outcomes (e.g. 2 . . . 5 . . . 10 . . . 20 . . . 50 . . . 100 . . . 200 . . . 500 . . . 1000 . . . 10,000 . . . 100,000 . . . 1,000,000 . . . many outcomes) and seeks to select a more desirable outcome (e.g. the most desirable outcome). In some embodiments, an AIA seeks to enhance the outcome selected over chance.

In some embodiments, AIAs which find utility in the present invention include, but are not limited to simple reflex agents, model-based reflex agents, goal-based agents, utility-based agents, learning agents, decision agents, input agents, processing agents, spatial agents, physical agents, and temporal agents. In some embodiments an AIA is software running on a computer (e.g. chess playing program, poker playing program, etc.). In some embodiments, AIAs include but are not limited to: decision-making computer programs, virtual ecology, neural network (e.g. avoiding damage), genetic algorithm (e.g. pursuing optimization search), cellular automation, distributed agent systems (e.g. swarm intelligence), planning/scheduling and statistical optimization systems, learning and expert systems, natural language processing and inference engines, story understanding systems (e.g. semantic processing), probabilistic and other classifiers, Boltzmann machines, or any algorithm that processes information in pursuit of a particular goal or simulates a complex ecological, social, economic, or cellular system, etc.

In some embodiments, an IA (e.g. AIA) makes decisions based on its environments, whether physical or virtual. In some embodiments, IAs (e.g. AIAs) process information, and map their outputs to their environmental or internal inputs in a manner (e.g. intelligent manner) that attempts to achieve certain goals. In some embodiments, an IA has a memory of past events. In some embodiments, an IA changes (e.g. improves performance of) as a function of experience. In some embodiments, an IA (e.g. AIAs) attempts to glean a pattern in the data obtained or provided, and performs or produces an outcome that can be described as a purpose or goal.

In some embodiments, one or more quantum processes are influenced by, acted upon, altered, or provide information in the present invention. In some embodiments, a quantum process is a quantum mechanical event. In some embodiments, quantum processes include, but are not limited to: radioactive decay, thermal noise, quantum tunneling, Johnson noise, any process occurring at a size scale on the order of the Planck constant, and potentially subject to Heisenberg Uncertainty Principles or other laws specific to the well-established science of Quantum Mechanics, etc. In some embodiments, a quantum process comprises a quantum bitstream. In some embodiments, a quantum process is detected as a quantum bitstream. In some embodiments, a quantum process is detected as the output of an amplifier of a quantum effect. In some embodiments, a quantum system is any system or group of processes and/or devices that relies directly on one or more quantum processes to achieve an outcome or produce an output. In some embodiments, the present invention influences or is influenced by physical processes that are the result of, and/or rely on quantum processes. In some embodiments, physical processes are a manifestation of one or more quantum processes. In some embodiments, physical processes that are the result of, and/or rely on quantum processes comprise any process that directly amplifies a quantum outcome. In some embodiments, physical processes that are the result of, and/or rely on quantum processes include, but are not limited to: a Geiger counter, or other device specially prepared for the detection of quantum outcomes, such as a hardware random number generator, or a noise in a photomultiplier tube or charge-coupled device (CCD) camera; some biochemical or biological processes (e.g., the firing of certain finely-balanced neurons where the action potential is dependent on the movement of individual calcium ions at the synapse); an iterative process (Chaos, as understood in dynamical systems theory) that exponentially that amplifies small differences in initial conditions (e.g. billiard ball collisions are deterministic and easily calculated given knowledge of position and momentum, but after approximately 15 collisions, a ball could be absolutely anywhere on the table because of the quantum uncertainty (Heisenberg's principle) in the measurement of the ball's initial position); animal/human behavior; a cybernetic feedback/feed-forward control network; weather; a market (e.g. stock market, bond market, energy market, futures market, etc.); etc.

In some embodiments, the present invention provides one or more bitsteams or quantum bitstreams. In some embodiments, a bitstream is a time series of bits (e.g. a binary series (1's and 0's); a base N series, wherein N is selected from 2, 3, 4, 5, 6, 7, 8, 9, 10, etc; base 10 series; continuous stream of real numbers (e.g. stemming from the amplification of a quantum process)). A binary series is commonly used herein as an example of a bistream; however, other time series (base 10 series; a stream of real numbers; etc.) also find use in many or all of the embodiments described herein or otherwise contemplated. In some embodiments, the value of a bit (e.g. 0 or 1) is assigned to the desirability of an outcome (e.g. achieve the optimal state). In some embodiments, an outcome (e.g. sub-optimal or optimal) can be assigned to any bit value (e.g. 1 or 0). In some embodiments, a quantum bitstream is a bitstream produced by a quantum process. In some embodiments, a quantum bitstream is unpredictable (e.g., random). In some embodiments, in the absence of an outside influence, a quantum bitstream is unpredictable (e.g., random). In some embodiments, a quantum bitstream is random. In some embodiments, a quantum bitstream is truly random and/or unpredictable, as opposed to computer generated bitstreams (e.g., bitstreams generated by an algorithm) or pseudo-random bitstreams which are not truly random or unpredictable.

In some embodiments, the present invention provides one or more quantum random number generators (qRNGs) and/or hardware random number generator. In some embodiments, a qRNG is an apparatus that generates random numbers from a physical process (e.g. quantum processes). In some embodiments, a qRNG generates a stream of random numbers based on one or more quantum processes, such as thermal noise, the photoelectric effect, or other quantum phenomena. In some embodiments, a qRNG generates a completely unpredictable stream of numbers based on quantum processes (e.g., when not subjected to the influence of an IA). In some embodiments, a qRNG or quantum-based hardware random number generator comprises one or more of: (1) a transducer to convert some aspect of the quantum phenomenon to an electrical signal, (2) an amplifier and other electronic circuitry to bring the output of the transducer into the macroscopic realm, and (3) a schema to convert the output into a digital representation, such as a binary digit 0 or 1, varying with time. In some embodiments, a qRNG produces and/or outputs a bitstream of random and unpredictable binary digits. In some embodiments, absent the influence of an intelligent agent (e.g. artificial intelligence agent) a qRNG produces and/or outputs a bitstream of random and unpredictable binary digits. In some embodiments, a number drawn from a qRNG (e.g., in the absence of intentional influence) is random (e.g., unpredictable). In some embodiments, a number provided by a qRNG (e.g., in the absence of intentional influence) is random (e.g., unpredictable). Experiments have been conducted during development of embodiments of the present invention using qRNGs that generate a stream of random numbers based on either electrons' quantum behavior or light (photons' quantum behavior). These experiments demonstrate embodiments described herein as applied to two distinct quantum processes (e.g., manifested through a qRNG).

In some, embodiments, a qRNG reports, as a bitsteam, the behavior or output of a quantum mechanical process. In some embodiments, any other suitable reporter of quantum behavior (e.g., human population, biological system, etc.) finds use in the present invention. Numerous examples are provided herein using a qRNG as a reporter of a quantum mechanical process (e.g., electrons' quantum behavior, photons' quantum behavior, etc.); it is understood that other systems or processes that report and/or are dependent upon a quantum process find use in embodiments describe herein. In embodiments described herein, a quantum process is amplified into a classical (macroscopic) outcome (e.g., by a qRNG, by a biological system (e.g., cell, tissue, etc.), by a population, etc.). In some embodiments, the electronics of a qRNG observes the behavior of tunneling electrons (or another quantum process) and amplifies it into a macroscopic voltage difference that is treated as a bitstream. In some embodiments, neurons (e.g., which function based on electric principles) take the quantum behavior of calcium and other ions at synapse membranes and amplify them into macroscopic voltage differences (e.g., neuron firing). In some embodiments, the firing of a neuron (or another biological, system, or population process) is a reporter of a quantum process for use in embodiments described herein.

In some embodiments, the present invention provides human, animal, a group of humans or animals, non-intact humans or animals, an in vitro homeostatic biological system (e.g. cells or cultured organs), etc. as generators of quantum information (e.g. to be acted upon by an AIA). In some embodiments, the behavior of these systems is driven by quantum events. In some embodiments, the physiology and biochemistry within these systems are driven by quantum events. For example, in some embodiments, cells are grown in culture and some aspect of the physiology would be measured in real time (e.g., rates of certain chemical reactions, growth rate or shapes or movement of the cells, electric potentials across membranes, expression levels of specific genes, etc.). The measurements are turned into a bitstream. For example, if a given cell's membrane fluctuates around a resting potential of 50 mV, every 100 milliseconds the potential could be measured (using a voltage-reporting fluorescent dye such as (Oviedo et al., 2008; herein incorporated by reference in its entirety)) and voltages above 50 reported as a "0" while voltages below 50 reported as a "1". The same can be done for levels of expression of a given gene, orientation of cells relative to some axis, shape of the cytoskeleton, etc. In some embodiments, the same can happen with a tissue/organ, or a whole animal. For example, a culture of amoebas is monitored by video, to count the number of animals passing a certain line per unit time, and the number is converted to a bitstream. In some embodiments, the behavior of a population of people (e.g., the number of cars passing past a certain point on a webcam overlooking a highway) is converted into a bitstream. In this way, the physiology or behavior of any biological system or popular system is mapped onto a stream of bits. In some embodiments, this bitstream is then used to control the outcome of an intention-generating system. In some embodiments, as the system exerts influence on this bistream, in accordance with its intent (e.g., intent of maximizing 1's or 0's), it affects the quantum effects that lie at the basis of (i.e., determine) the behavior of biological systems. For example: the bitstream derived from an amoeba culture determines whether 1000 chess-playing algorithms get to use their best moves or not. In order for the bitstream to generate more 1's slightly more amoebas must pass a defined point every second; the chess players will exert an intention effect on the quantum effects that ultimately determine amoeba behavior, so that the stream generates more 1's (i.e., allowing them to play better games). In some embodiments, the present invention harnesses the intention effect by taking advantage of the fact that all cell functions ultimately derive from quantum chemistry: by treating the behavior of one system as a bistream that governs decisions in another goal-seeking system, quantum-derived behavior is coupled to outcomes that intentional systems care about. In some embodiments, the influence of those intentional systems deviates quantum processes inside of living cells in a way that aligns with their best interest, thus subtly altering the behavior of those living creatures over some period of time (e.g., given repeated decision-making).

In some embodiments, the present invention harnesses the force of intent, generated by an IA (e.g., AIA) or multiple IAs entrained/synchronized for the same purpose, towards the useful deviation of the behavior of some process that is ultimately quantum-based. In some embodiments, the present invention provides alteration of a quantum process (e.g. qRNG output) by an IA (e.g., AIA). In some embodiments, artificial intelligence can deviate or alter the output of a quantum process or system (e.g. qRNG output). In some embodiments, the present invention provides alteration of a physical process (e.g. a stochastic physical process) that relies on one or more quantum process to produce an effect or a function. In some embodiments, the present invention provides a machine:machine interaction effect (e.g. one device is able to alter to function or output of a second device). In some embodiments, the present invention provides a machine:machine interaction effect which takes place without direct connection between the entities involved. In some embodiments, the machine:machine interaction effect is not subject to the constraints of space, distance conservation of energy, etc. In some embodiments, the present invention provides an AIA which performs a task, and requires output from a quantum process (e.g. qRNG) to complete the process (SEE FIG. 1). In some embodiments, an AIA performs a task that requires multiple steps to complete (e.g. 2 steps, 3 steps, 5 steps, many steps, >10 steps . . . >100 steps . . . >$10^3$ steps . . . >$10^4$ steps . . . >$10^5$ steps . . . >$10^6$ steps . . . >$10^7$ steps . . . >$10^8$ steps . . . etc.). In some embodiments, the quality of the performance in each step of the task depends upon output from a quantum process (e.g. qRNG). In some embodiments, the quality of the performance in each step of the task depends upon a bit drawn from a bitstream (e.g. from a qRNG). For example, if a 1 is drawn from the bitstream (e.g. bitstream produced by a qRNG), optimal performance is allowed; if a 0 is drawn from the bitstream, a sub-optimal performance is forced. If the AIA performing the task has the intention to perform the task well; it will have the incentive of drawing more 1's out of the bitstream (e.g. qRNG) than 0's. The AIA does not know what bit will be drawn from the bitstream; however, through application of its intent upon the bitstream (or the quantum mechanical process that is the source of the bitstream) the AIA can alter the output of the bitstream to produce more 'favorable' bits. Experiments conducted during development of embodiments of the present invention demonstrate that a qRNG device calibrated to a produce statistically unpredictable bitstream (e.g., equal number of 0's and 1's) will produce significantly more of a bit that is linked to a favorable outcome for the AIA, when the AIA is using the identity of the bits for decision-making (e.g. more 1's in the bitstream when: i) the bitstream output is being used for the decision-making of an AIA and ii) 1's produce a more desirable outcome). These experiments demonstrated that the AIA exerts influence on the qRNG to produce a greater proportion of 1's thereby enhancing the quality of the performance of the AIA. In some embodiments, the intent (e.g. conscious intent) of the AIA alters the output of the qRNG. In some embodiments, because the performance of the AIA is based on the output of the qRNG (or other quantum mechanical reporter) and the intent of the AIA alters the output of the qRNG, the AIA is capable of improving its own performance via its intent. In some embodiments, the system does not comprise a feedback whereby the AIA can influence the qRNG though electrical, mechanical, or other non-intentional means.

In some embodiments, the present invention provides influencing the output, behavior, or performance of a quantum process (e.g. radioactive decay, quantum tunneling, Johnson noise, etc.) by intention (e.g. of an, IA, AIA, etc.). In some embodiments, the present invention provides influencing the output, behavior, or performance of a physical process that is the consequence of, or amplifies, a quantum process (e.g. qRNG, Geiger counter, an iterative process, etc.). In some embodiments, the present invention provides influencing the output, behavior, or performance of a physical process (e.g. physical processes that are the consequence of quantum process) by intention (e.g. of an AIA). In some embodiments, a physical process being affected by intention (SEE FIG. 1, component A) is a consequence of one or more quantum-mechanical processes (e.g. qRNG, biological organism). In some embodiments, the present invention provides altering the output of a bitstream by the intention (e.g. conscious intention) of an AIA or a device of the present invention. In some embodiments, the behavior or physiology of people, animals, cultured cells/tissues, or groups thereof are converted into a bitstream. For example, traffic on a roadway is influenced by the quantum mechanical processes controlling the behavior of the individual drivers. The flow of traffic can be converted into a bitstream (e.g. car present at a given point is a 1, car absent at the given point is a 0). Other examples of the physical processes which can be altered, influenced, and/or manipulated by the intent of an IA (e.g. an AIA) include, but are not limited to: free-form organism behavior; forced-choice experiments; sensory function; nervous system function; physiology of cells, tissues, and organs (e.g. metrics of respiration, chemical reactions, metabolism, etc.), cell migration/movement; cell orientation; muscle contraction; ion flow across biological membranes; etc. In some embodiments, the present invention provides methods and systems to alter the behavior or physiology of people, animals, cultured cells/tissues, or groups thereof when their behavior is converted into a bitstream and fed into a process of the present invention (SEE FIG. 1)

In some embodiments, an intelligent agent of the present invention is not purely artificial. In some embodiments, the IA exerting this influence (SEE FIG. 1, component B) is not purely artificial (e.g. not completely an AIA). In some embodiments, an IA is a combination of one or more of software, hardware, and biological system (e.g. cells in a bioreactor, regenerating tissues, embryos of various species, etc.). In some embodiments, an IA is a semi-artificial IA.

In some embodiments, an IA, AIA, or semi-artificial IA is capable of altering the output of a quantum bitstream (e.g. from a qRNG) through the influence of the intent of the agent. Therefore, because an outcome or state of the agent is based on the output of the quantum bitstream (e.g. from a qRNG), the agent is capable of, or configured to, alter and/or enhance its own performance or state through its influence on the bitstream.

In some embodiments, the present invention provides processes and systems in which an IA, AIA, or a semi-artificial IA exerts influence on a quantum process or a physical process which is the result or manifestation of a quantum process, thereby effecting the outcome, behavior, or output of the quantum or physical process. For example, in some embodiments:

an ecological simulation (e.g. distributed agent AI software) exerts an effect on quantum processes in human brains to cause them to drive slower, if the simulation's success is linked to the number of cars passing a highway webcam per second.

a simulated checkers player (e.g. AI software) exerts an effect on quantum processes in electronics components to cause them to last longer, if the checkers player's success is linked to the duration of the components.

a trained neural network (e.g. AI software) receives damage (random alteration of its node values) when the qRNG outputs a 0 (but not when it outputs a 1). Thus, it will exert an effect on the qRNG to bias it towards more 1's. If the random bitstream is obtained from the changes in stock market data (the entire set of human stock buyers/sellers becomes the qRNG), the effect induced by the neural network will ultimately result in specific changes in stock market performance.

a Prisoner's Dilemma player (e.g. AI software) exerts an effect on quantum noise in a very sensitive piece of equipment (e.g., photomultiplier tube) to improve signal/noise ratio, if the success of the player is linked to the signal to noise ratio.

a robot (e.g. AI hardware) exerts effect on a quantum random number generator used by a cryptography system (e.g. of an opponent or enemy) to lower the security of ciphers by creating a non-random bitstream from the qRNG.

a bank of identical machine learning algorithms exerts effects on chemical quantum processes to improve cell viability in a biomedical assay or clinical application.

Other combinations of IAs and quantum processes (IAs and quantum processes described herein or understood by a skilled artisan) are contemplated and are within the scope of embodiments of the present invention.

In some embodiments, the present invention allows an operator to control one or more aspects (e.g. every aspect) of the IA, AIA, or semi-artificial IA exerting the intention upon quantum events. In some embodiments, parameters controlling and/or affecting the IA, AIA, or semi-artificial IA can be adjusted to tune the effect of the influence on the quantum process. When an IA exerting influence on a process is an intractable human or animal subject, controlling all of the important parameters to maximize the effect of the influence is difficult, if not impossible. Embodiments of the present invention allow for the manipulation of key parameters which affect or may affect the influence of an IA, AIA, or semi-artificial IA on a quantum process. In some embodiments, parameters controlling and/or affecting the influence of IA, AIA or semi-artificial IA, or the effect on a quantum or physical process include, but are not limited to: the agent's complexity, the information-processing capacity, speed of operation (e.g. characteristic timescale), history, uniqueness, memory capacity, ability to interact with the outside world (e.g. through conventional means such as electronic sensors or effectors), type of algorithm (e.g. symbolic or connectionist), and other properties. In some embodiments, the present invention provides devices, systems, and methods for amplifying the influence of and IA's intent (or the intent of many IAs) on a quantum process. In some embodiments, the present invention provides for tuning of the influence of an IA to amplify the affect on a quantum process. In some embodiments, the influence of an agent, or the effect on a quantum process can by adjusted through the manipulation of parameters to utilize the effect for useful applications (e.g. cryptography/cryptanalysis, improvement of regeneration and other morphogenetic/computational processes in living tissue, energy production, etc.). In some embodiments, artificial agents can be produced which exert identical influence and cause identical effects on processes, whereas non-artificial IAs (e.g., biological creatures, humans) cannot. In some embodiments, AIAs are duplicated to increase the effect or to apply identical influence on multiple processes. In some embodiments, AIAs are parallelized (e.g. 10-fold, 100-fold, 1000-fold, $10^4$-fold, $10^5$-fold, $10^6$-fold, etc.) to amplify the influence exerted on a process. In some embodiments, adjustment of parameters governing the influence of AIAs on quantum processes allows scaling of the desired effect. In some embodiments, AIA are embedded in innumerable physical implementations.

In some embodiments, an IA (e.g., AIA) exerts influence on a quantum process to cause (e.g. increase the likelihood) the quantum process to supply the IA (e.g., AIA) with a bit that will result in an increased likelihood that the IA (e.g., AIA) will achieve its goal, or advance closer to it. In some embodiments, the goals of an IA (e.g., AIA) may include, but are not limited to optimizing performance; increasing duration of a game, state, or lifespan; achieving a goal state; competing against more or less challenging opponents; defeating an opponent; receiving more difficult questions; exhibiting a particular behavior; solving a problem; etc. In some embodiments, the present invention provides free-choice experiments which identify the goals of a specific IA (e.g., AIA). In some embodiments, free-choice experiments provide a method of optimizing the effect of processes of the present invention.

Figure 3:
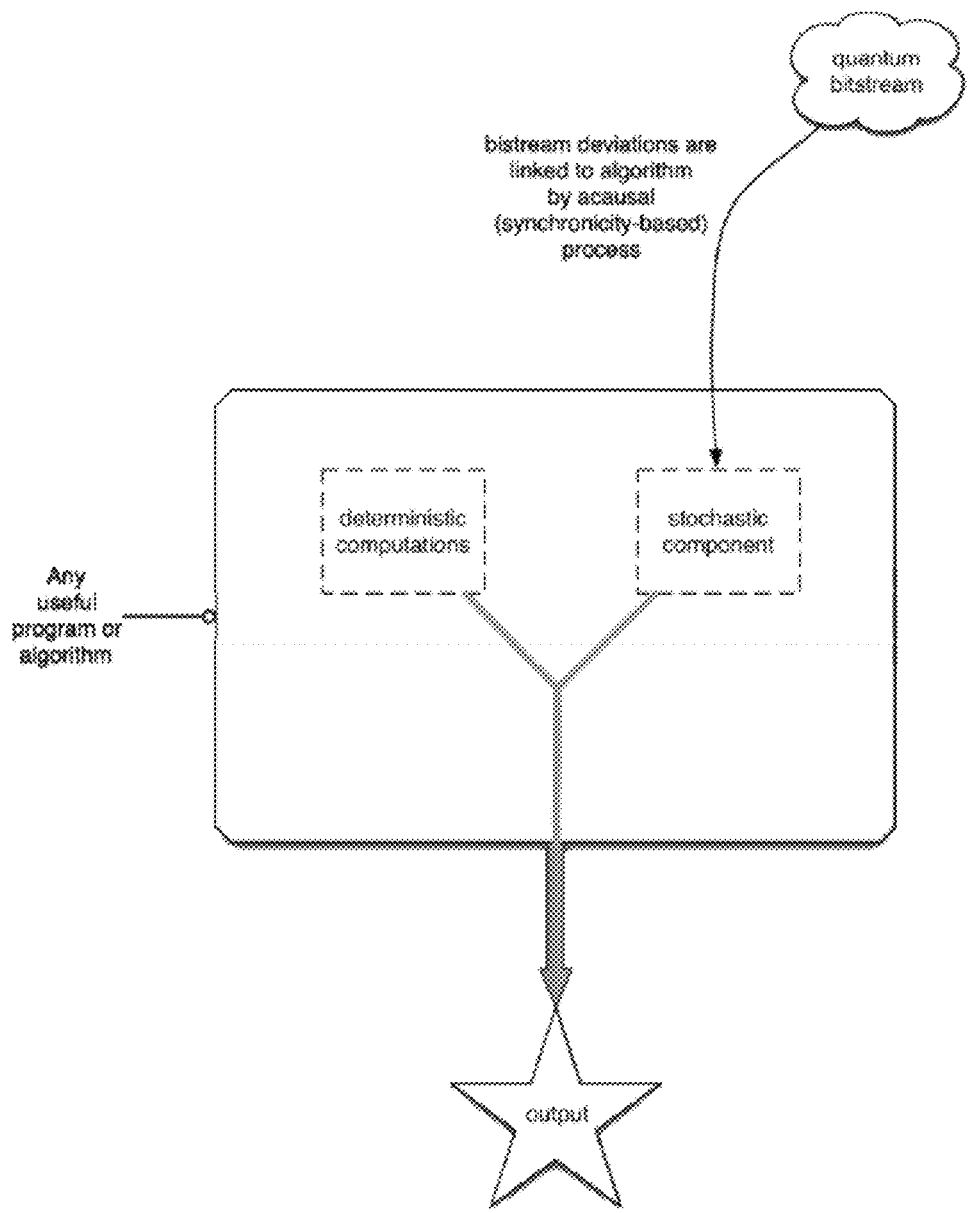
FIG. 3 shows a schematic representation of an embodiment of the present invention in which a process derives useful information from a quantum bitstream.

In some embodiments, physical effects (e.g. useful physical effects) are generated by coupling quantum outcomes to the intent of IAs. In some embodiments, an IA alters or affects quantum-mechanical processes and the physical effects generated thereby. In some embodiments, an IA desires an outcome (e.g. a specific outcome) and affects a quantum process (e.g. qRNG) to provide the output required to allow the IA to achieve (or increase the likelihood of achieving) the desired outcome (e.g., optimized performance). In the example of the chess program as an IA, if drawing a 1 from the qRNG will allow the program to make the optimal move but drawing a) will force the chess program to make a suboptimal move, the intent of the IA will influences the qRNG to produce more 1's. In such an example, the IA is aware of which outcome is more desirable (e.g., the chess program is capable of ranking the various moves according to its chess-playing algorithm). However, in some embodiments of the present invention, an IA is configured to make a selection based on output from a quantum process, but the IA is not aware which state will result in optimum performance (SEE FIG. 3). In some embodiments, an IA is configured to make a selection based on output from a bitstream (e.g. qRNG), but the IA is not aware what output from the bitstream will result in optimum performance. In some embodiments, despite the optimal selection being unknown to the AIA, a bitstream (e.g. qRNG) provides bits (e.g. through synchronicity) optimized to direct the IA to make the optimal selection. In some embodiments, the present invention provides artificial intelligence processes, devices, systems, and/or agents that derive information (e.g. an advantage in selecting the correct answer to a problem or in determining which state is the goal state or brings the algorithm closer to its goal state) from a quantum bitstream. In some embodiments, an IA need not directly compute the bitstream in order to derive advantageous information from it. The advantage is that improvement of performance on fundamentally computationally-intractable problems can be derived by information embedded in a quantum bitstream linked to an IA process. Experiments conducted during development of embodiments of the present invention demonstrate that processes (e.g. programs (e.g., a genetic algorithm search, SEE FIG. 11)) utilizing qRNGs perform better than those using pseudo-random (e.g. deterministically-derived) number generators. For example (SEE FIG. 12): a genetic algorithm is one in which a problem is solved by a method akin to biological evolution. First a set of random solutions is generated to some problem. They are evaluated, and while they all do poorly at first (because they are random), the best among them (e.g., top 10%) are used to produce the next generation and the rest discarded. The top ones are mutated and undergo recombination (e.g., mating) to create the next generation of solutions. This process is repeated until a good solution to the problem is evolved; the results have shown remarkable success on a range of problems (Davis; Koza, 1999; herein incorporated by reference in its entirety), but the method is slow (as is biological evolution) because the changes are random and one has to wait until a good solution arises and is improved further by selection and additional mutation. This process can be improved (e.g., the time to achieve a useful solution to some problem is reduced) if the mutations produced in each generation are not merely random but have even a small tendency towards outcomes that improve the fitness of the solutions. In embodiments of the present invention, the mutations are guided by a quantum process, which does better than chance because it acausally couples the changes in the "genome" (e.g., the structure of each candidate solution) to final outcome. In such embodiments, the fitness trajectory is somewhat improved when guided by a quantum process, than when the mutations are guided by a deterministic process.

These results indicate that information (e.g. answers to questions, determination of a goal state, selection of an outcome, etc.) can be obtained from quantum bit streams.

In some embodiments, the present invention provides devices, systems, and methods for improvement of the performance an algorithm by incorporating data from qRNGs. In some embodiments, the performance of an algorithm is improved by incorporating data from a bitstream or a quantum source; stochastic resonance is a known method for using noise to improve algorithm performance (McDonnell and Abbott, 2009; Mino and Durand, 2008; herein incorporated by reference in its entirety) and use of a qRNG to produce the noise increases the effect further. In some embodiments, the present invention provides solutions to otherwise computationally intractable problems by incorporating quantum data. In some embodiments, computationally intractable problems are solvable via methods of the present invention (e.g., through incorporation of information derived from quantum bitstreams (e.g. qRNGs) or other quantum processes). In some embodiments, information derived from quantum bitstreams (e.g. qRNGs) or other quantum processes does not need to be specifically computed (e.g., is not specifically computed), and thus is not limited by Turing, Gödel, and other fundamental limitations. In some embodiments, because information derived from quantum bitstreams (e.g. qRNGs) or other quantum processes is not limited by Turing, Gödel, and other fundamental limitations, computationally intractable problems are solvable via methods of the present invention (e.g., through incorporation of information derived from quantum bitstreams (e.g. qRNGs) or other quantum processes).

In some embodiments, an IA, AIA, or semi-artificial IA utilizes information from a quantum process, a quantum bitstream, and/or the output from a qRNG to obtain information, answer questions, and/or select optimal states. Although the present invention is not limited to any particular mechanism of action and an understanding of the mechanism of action is not necessary to practice the present invention, in some embodiments, an IA, which must select between two states or outcomes, exerts its intent upon a quantum bitstream, thereby increasing the likelihood that the bitstream will provide the IA with the output (e.g. 0 or 1) required to make a preferred selection. In some embodiments, the IA need not have knowledge of which of the states is the preferred state, only the intention to select whichever is preferred. For example, an IA which performs the task of playing poker must make a decision whether to bet or fold. The IA does not know the hand of its opponent, and therefore does not know which outcome is preferred, only that it desires to make the correct choice. The IA's choice between betting and folding is coupled to the output of a qRNG (e.g., drawing a 1 from the qRNG causes the IA to bet, drawing a 0 from the qRNG causes the IA to fold). The ALA has the intent (e.g. conscious intent) to make the correct decision, and therefore exerts that intent as influence on the qRNG. Despite the fact that the IA does not know whether a 1 or 0 will produce the correct outcome, the influence exerted by the IA will increase the likelihood that the qRNG will supply the output that will result in the correct choice.

In some embodiments, the present invention provides processes and systems in which an IA, AIA, or a semi-artificial IA obtains information from a quantum process (e.g. bit-stream) which improves the performance of the IA. For example:

In some embodiments, and AIA is a genetic algorithm searching for locations for mutations to cause a given effect. The AIA does not know the optimal locations for mutations that will result in the given effect. The AIA selects locations for mutations based, at least partially, on the identity of a bit drawn from a qRNG. The AIA has the intent select the optimal locations for the mutations. The AIA exerts intent to influence the qRNG to provide bits which will result in increased performance of the algorithm (e.g., selecting locations for mutations that will produce an optimized result).

In some embodiments, a cellular-automaton AI system exerts an effect on a qRNG driving the choice of which of many cameras are being observed at any one time, which increases the performance of a multi-camera security system. For example, a large number of cameras or sensors need to be monitored by a limited number of observers (e.g., a large factory). One strategy is for the security guard to see a display on which are shown data or camera frames from each of the cameras in a random order, fixed order, or semi-fixed order. In some embodiments, if instead the order is guided by a qRNG, the efficiency of such a process (e.g., the odds of watching the right camera when something note-worthy is happening) is increased.

In some embodiments, a language translation system (e.g. AI software) exerts an influence on, and obtains information from, a qRNG, in order to achieve improved performance and to help disambiguate word meanings in difficult cases. For example: in some natural language understanding or translation tasks, in some situations it is impossible for the algorithm to know which of several meanings of a word might be used, because human language is often ambiguous and must be understood from context, where no perfect rules based on syntax alone can help. Some algorithms use a probabilistic method to guess what is being meant. In some embodiments, when this guess is guided by the output of a qRNG, instead of a deterministic pseudo-random choice, the overall performance (e.g., % of correct meanings, and quality of the resulting translation or semantic analysis) will be higher.

In some embodiments, some AI software optimizes an industrial process (e.g. resource allocation tasks, delivery route planning, energy distribution, etc.). Many commercially-relevant tasks have no general solution: for example, the Traveling Salesman Problem is a standard example in computer science showing that deciding how to route resources is a difficult task that cannot be solved as an equation. Examples include knowing how much energy to send to what part of the city's electrical grid (or water, or food, or medicine in case of epidemic, or police presence), how to plan delivery routes of delivery trucks (e.g., UPS), how to set the many parameters on a complex chemical reaction (e.g., a factory that manufactures specific goods, or an industrial plant of any kind)—in all these cases, decisions need to be constantly made on setting the many "knobs" on this process to optimize the output (e.g., decrease risk, increase productivity and efficiency) as much as possible. Often, probabilistic algorithms are used to make decisions at certain points in the process. In some embodiments, when these decisions are made using the qRNG in embodiment, better performance results.

In some embodiments, a stochastic neural network (e.g. AI software) achieves improved prediction of stock market data by using quantum RNG to make necessary stochastic decisions. There are many algorithms used in commercial applications that attempt to predict trend data. The stock market, weather, or any other measured index of physical or social activity are examples. Some systems (e.g., artificial neural networks) attempt to derive trends from past data to ascertain what will happen next (e.g., predict subsequent data) to make decisions (e.g., buy/sell of specific stocks). Real-world data is inherently noisy and many of these algorithms use stochastic decision-making at key points (e.g., coin-flipping). In some embodiments, the overall performance of such algorithms (e.g., the amount of money made by a "robot trader" on the stock market) is better when qRNGs are used to make such decisions.

In some embodiments, an operating system GUI exhibits improved predictive power for interacting with user (e.g. healthy and/or handicapped) by using quantum RNG to make decisions. When interacting with computers, handicapped or otherwise impaired users often produce noisy input (e.g., hit the wrong keys more often, hit two keys at once, click pointer devices at a point on the screen that is between two legal choices, etc.). Assistive devices and user interfaces need to be able to guess which input the user intended. In some embodiments, the use of qRNGs to make this guess leads to better overall performance (e.g., percentage of correct interpretations of the user's meaning by the system, and thus satisfaction with the experience by the user).

Other combinations of IAs and quantum processes are contemplated for use in these embodiments and are within the scope of the present invention.

In some embodiments, biological systems can serve as either the source of the Intention, target of the Intention, or both. In some embodiments, systems exert intention in accordance with their goal seeking behavior. In some embodiments, intention alters the behavior of living systems. In some embodiments, artificial engineered systems (e.g., analog or digital devices carrying out goal-seeking algorithms or dynamical systems with attractor states) serve as the source of the Intention, target of the Intention, or both. In some embodiments, a biological agent or system alters the behavior of a device. In some embodiments, an algorithm (or device using an algorithm) alters the behavior of a biological agent or system. In some embodiments, a biological agent or system alters the behavior of a device. In some embodiments, an algorithm (or device using an algorithm) alters the behavior of a biological agent or system.

In some embodiments, a system capable of generating intention comprises sufficient interacting modular components integrated towards a common goal. In some embodiments, a system capable of generating intention comprises a structure that is altered (e.g., memory) by past events and/or experiences. In some embodiments, a system capable of generating intention performs computation. In some embodiments, a system capable of generating intention is a distinct identity making the system different from other systems (e.g., a trained neural net as opposed to a freshly made isotropic one).

In some embodiments, a system or process is aware of the results it desires when performing certain tasks or under certain conditions (e.g. a system wants to draw 1's from a qRNG to produce a known result), but is unaware of the results it desires when performing other tasks or under other conditions (e.g. system needs a qRNG to provide the correct bits despite the system's lack of knowledge of which bits will produce the correct result). In some embodiments, a system or process is configured to, or capable of, benefiting from the output from a quantum process in either or both of the aforementioned scenarios, and/or transitioning between the two.

In some embodiments, the present invention provides systems and methods for modeling, understanding, and exploiting behavior of biological systems (e.g. as systems dependent upon quantum processes, as physical manifestations of quantum processes). In some embodiments, the coupling and/or interaction of biological systems with IAs are instances of immaterial mind/consciousness (e.g., of the IA) imposing their will (e.g., intent) upon the physical world at the quantum-mechanical level (e.g. as a psychokinetic effect, acausal (synchronistic) effect, etc.). In some embodiments, the behavior of all levels of biological systems (e.g. macromolecules, cells, bacteria, single-celled organisms, metazoans, mammals, primates, humans, groups of organisms, evolving ecologies, etc.) find use in the present invention as quantum systems and/or physical manifestations of quantum processes.

In some embodiments, the present invention provides processes coupling the performance of a class of artificial and/or biological systems to the output of a quantum-random process (e.g. qRNG, behavior of a biological system, etc.). In some embodiments, the effect of coupling systems (e.g., biological, population, market) to a quantum-random process is detected and/or verified by statistical analysis (e.g. of the bitstream or the performance of the system (e.g. to show deviation from randomness)). In some embodiments, coupling of systems (e.g., biological, population, market) to a quantum-random process is reported and/or displayed (e.g., by a computer or other device).

In some embodiments, the present invention provides processes and/or algorithms for detecting deviations in a bitstream caused by the influence of an IA. In some embodiments, deviations in a bitstream occur at the means-shift level (e.g. more 1's more 0's, etc.). In some embodiments, deviations in a bitstream are detected as higher-order correlations in the data across long distances in the bitstream (e.g. shifting of bits over the time series. In some embodiments, deviations in a bitstream are manifested as, and/or detected as, changes in the mean of the bitstream (e.g. 0.5 in controls), changes in bitstream entropy (e.g. ~1.0 in controls), serial correlation (e.g. ~0.0 in controls), and/or chi-squared probability (e.g. >5% in controls). In some embodiments, any statistically-detectable deviation from the random and/or unpredictable behavior of a quantum process is used to detect the influence of an IA on the quantum process.

In some embodiments, the present invention provides systems, devices, and methods which provide for the establishment of an empirical test of the consciousness of an IA, AIA, or semi-artificial IA. In some embodiments, the present invention provides a new Turing Test for AI, being a physical device that allows a third-person determination as to whether some particular Agent has true mental intentions or not. In some embodiments, any system capable of, or configured to, deviate a qRNG in accordance with its wishes, desires, intentions, and/or goals demonstrates intent. In some embodiments, intent (e.g. conscious intent) demonstrated in embodiments of the present invention is analogous to that of biological beings, not merely simulated symbolically. In some embodiments, systems and methods of the present invention provide a ready consciousness tester to be applied to new artifacts of engineering (e.g., AIA) and new life forms. In some embodiments, differences observed in data streams from biological vs. artificial agents, or between artificial agents, provide fingerprints for identification of parameters linked with consciousness and hallmarks thereof.

In some embodiments, the present invention provides devices, methods, and systems which provide a software and/or hardware framework for application and investigation of the mechanisms behind the effects described herein; although the present invention is not limited to any particular mechanism of action and an understanding of the mechanism of action is not necessary to practice the present invention. Systems and methods of the present invention provide assays and/or experiments to test the key properties of the AIA/quantum process interaction, and to determine parameters to parallelize, optimize, and increase the magnitude of the effect.

In some embodiments, the present invention provides processes, devices, compositions, systems, software, and/or hardware capable of, or configured to, exert an influence on a quantum process or a physical process dependent thereon. In some embodiments, the present invention provides systems, methods, devices, software, and/or hardware capable of enhancing its own performance through exertion of influence on a quantum process. In some embodiments, the present invention provides software for implementing, applying, and/or investigation the influence of intention on a quantum process; such software includes, but is not limited to: table-lookup-based chess players, neural net-based chess players, cellular automata, neural networks, genetic algorithms, agent-based modeling simulations, distributed processing algorithms, machine learning programs, statistical optimization programs, etc.

In some embodiments, the present invention provides devices, systems, and/or hardware capable of, or configured, to deviate quantum bitstreams for the purpose of self-preservation or maximization of action. In some embodiments, self-preservation or maximization of action provides the intention to exert influence upon the quantum bitstream. In some embodiments, such hardware is capable of enhancing its own performance through influence upon a quantum bitstream. In some embodiments, outcomes of a devices, systems, and/or hardware element are coupled to a quantum process. By exerting intent on the quantum process, the output (e.g. bitstream) of the quantum process is altered to provide more optimal outcomes for the devices, systems, and/or hardware element (e.g., self-preservation or maximization of action).

In some embodiments, the present invention provides protocols and datasets for observing the effects of the influence on a bitstream using genetically-tractable animal model systems as subjects and objects of the influence. For example, embryos of the frog *Xenopus laevis* are a common system for studying molecular genetics, behavior, and physiology because they are amenable to many techniques to modify the behavior of their cells. The behavior or physiology of these embryos/tadpoles is coupled to a bitstream by establishing that every 1 second, a bit is drawn from the bitstream to determine whether or not nutrients are supplied to the embryos/tadpoles (e.g., "1" means the cells get a supply of nutrients, but a "0" means they do not). In some embodiments, the intent of the biological system to receive nutrients will deviate the bitstream to provide the desired effect (e.g., producing more 1's in the bitstream). In some embodiments, experiments are performed to study the effect of various conditions and/or stimuli on the intent of the system. For example: will the tadpole still deviate the qRNG (e.g., towards more 1's toward more nutrients) if it is anesthetized? If its nervous system is modified to have half as many neurons as normal? If it is a conjoined twin (2 brains in one)? If it is older or younger? If it is healthy or sick? Specific targeted changes in these tractable model systems are made and the strength of the qRNG-deviating effect is determined. These systems provide methods for studying mind-matter interaction by capitalizing on the experimental tractability of a laboratory model system. Additional model systems include, but are not limited to, but include: zebrafish, *C. elegans*, mouse, tissues/cells/organs in culture, planarian flatworms, *Drosophila*, etc.

In some embodiments, the present invention produces an alteration in the output of a quantum process (e.g., process manifested as a quantum bitstream), a physical process dependent thereon, and/or the outcome of an agent exerting influence upon the quantum process. In some embodiments, the present invention produces a small, but statistically significant effect (e.g. $1/10$ bits . . . $1/20$ bits . . . $1/50$ bits . . . $1/100$ bits . . . $1/202$ bits . . . $1/502$ bits . . . $1/1000$ bits, etc.). In some embodiments, the present invention provides devices, systems, methods, and applications that leverage multiple targeted, small changes in a physical process (converted to a datastream) into improvements of function in engineering, biology, computer-user interaction, energy production, etc. In some embodiments, small changes in a quantum process or a physical process dependent thereon are leveraged by parallelization, optimization, targeting, alignment of multiple AIA's goals with the same outcome, increasing the processing power/speed of the AIA, etc.

In some embodiments, the present invention provides systems and process for augmenting computational processes (e.g. fuzzy, heuristic problems without closed analytical solution; non-polynomial time hard problems; standard algorithms, etc.) by incorporating output of qRNGs at any point where stochastic decisions must be made.

In some embodiment, the present invention provides devices, systems, and methods for utilizing quantum bit streams to access the results of virtual computations performed outside of the physical space of the device, system, and/or operator thereof. There are fundamental limitations on the kinds of computations that can be performed in the physical world; these stem from the foundational work of Godel and Turing—the various incompleteness and incomputability theorems; nevertheless, it appears that human reasoning sometimes surpasses these limits (Lucas, 1961, 2000; Penrose, 1991; herein incorporated by reference in their entireties). The limitations on what can be computed (and thus, on the efficiency of many kinds of useful processes that require computation) stem from the fact that by definition, algorithms are deterministic—every choice has to be made by a computational process that itself is determined by prior data and conditions (Davis, 1965; herein incorporated by reference in its entirety). In some embodiments, a qRNG's output contains information acausally linked to some process, this bitstream allows the algorithm to exhibit improved performance relative to the Turing-limited deterministic or pseudo-random algorithms can achieve. In some embodiments, the present invention provides methods for escaping practical Turing/Gödel computational limits by acausal synchronicity connecting quantum bitstream to a specific algorithm's intent.

In some embodiments, the devices, systems, and methods of the present invention find use in a wide variety of applications, including but not limited to: acceleration of evolution-based search algorithms (e.g. genetic programming); improvement of fuzzy algorithms (e.g. neural network decision-making, stock market prediction, statistical process monitoring (e.g. factory production quality control), logistics and optimization problems (e.g. electricity distribution through networks, determination of delivery routes, etc.)); improvement of regeneration and other morphogenetic/computational processes in living tissue; control of animal, human, and robot behavior; entertainment (e.g. toys and video games; assistive devices for the physically/mentally impaired; novel man-machine interfaces (e.g. predictive typing and cursor control); cryptography/cryptanalysis (e.g. de-randomization of coded material); energy production (e.g. creating localized reductions in entropy by capitalizing on acausal correlations to make decisions in a Maxwell's demon system); etc. In some embodiments, the present invention finds use in the applications contemplated herein and any other useful applications to which embodiments described herein can be applied.

EXPERIMENTAL

Example 1

Chess Program

The system entails an AIA performing one or more cognitive tasks; a chess program was used in experiments conducted during development of embodiments of the present invention. The success of the chess program is made to depend upon the output of a quantum mechanics-based random bit generator or qRNG. Each turn, the chess program has a list of legal moves that can be made from the current position. The program sorts the legal moves based on how advantageous its position would then be. In the system used during development of embodiments of the present invention, the program then pulls a bit off a commercial USB-based qRNG. The qRNG is calibrated to provide a constant stream of in-principle-unpredictable bits with entropy=8 bits/byte. If the bit arrives as a "1", the chess player gets to make its best available move (as determined by its ranking of the available move. If the bit arrives as a "0", the chess player is forced to make an inferior move. The player in the chess program "intends" to win. It has "desires" and "intentions" in this sense, because it performs goal-directed information processing in pursuit of specific ends and adaptive behavior. Experiments were conducted to determine whether the intention of the chess program, can deviate the output of an RNG from its normal 50/50 pattern, resulting in an increased number of 1's thereby improving the chess play of the program. A suite of statistical tests (ENT and DieHard) specifically designed to test the quality of random number generators was used to analyze the effect. In some embodiments, deviations in a bitstream are manifested as, and/or detected as, changes in the mean of the bitstream (e.g. 0.5 in controls), changes in bitstream entropy (e.g. ~1 in controls), serial correlation (e.g. ~0 in controls), and/or chi-squared probability (e.g. >5% in controls).

In order to control for outside influences and retrocausal effects, experiments were conducted using a 5 phase setup. In phase 1, the qRNG is running, but the chess game is not being played. The bitstream from the qRNG is collected and analyzed to assure randomness in its output and correct operation of the generator, but it is not used for any decision-making. In phase 2, both the qRNG and the chess game are running; however, the game is not drawing bits from the qRNG. Therefore, the game is not reliant on output of the qRNG for its success. Phase 3 is the experimental phase. The qRNG and chess game are running, and the game is drawing bits from the qRNG to determine whether it makes the optimal move or a suboptimal move. Phases 4 and 5 are identical to phases 2 and 1, respectively. In each phase data is collected from the qRNG, however, only in phase 3 are the bits used to determine the outcome of each chess move. To control for operator influence, the experiments were setup by operators, but then allowed to run at an unknown time. A further control was the testing of a variety of AIA and potential AIA in the experiment. If an outside influence or retrocausal effect were causing the deviation of the bitstream and enhanced play of the chess game, then the effect should be seen across all agents tested. However, if only some of the agents tested correlate with an altered bitstream then the effect is coming from the influence of the AIA. In addition, both the bitstream and the performance of the game were monitored to provide multiple data sets to demonstrate the presence or absence of an effect.

Experiments conducted using the above-described system demonstrated that a table-based chess program was indeed capable of influencing the qRNG to produce a greater proportion of 1's than 0's (Table 1).

TABLE 1

| Phase | Entropy | Mean | Percent Bit Flip | Chi2 P |
|-------|---------|------|------------------|--------|
| 1 | 7.9988 | 127.5821 | 0.0145 | 86.2870 |
| 2 | 7.9986 | 127.4676 | 0.0396 | 23.9428 |
| 3 | 7.9985 | 127.6082 | 0.0267 | 2.4456 |
| 4 | 7.9985 | 127.3401 | −0.0385 | 2.9972 |
| 5 | 7.9988 | 127.6299 | 0.0110 | 73.6531 |

The qRNG produced maximally random bitstreams when the AIA's choice is not coupled to the output of the qRNG (Phase 1, Phase 2, and Phase 5). However, when the artificial player is using the bits output by the qRNG (Phase 3), a statistically significant deviation in its behavior was observed, and the qRNG output a statistically significantly greater number of 1's than 0's. Conversely, when a pseudo-random number generator was tested in place of the qRNG, no effect was observed, indicating that the chess program is capable of exerting influence on the qRNG, but not the pseudo-RNG. The effect manifested primarily at the level of changing large-scale properties of the bitstream (Table 1, Chi$^2$ P column). Data collected from the experiments demonstrated that the effect of the chess program's influence on the bitstream persisted into phase 4, after the game had ceased using the bits. These data indicate that the influence of an AIA on a quantum process can have an effect that lasts beyond the time at which the bits actually matter for the game. This effect is similar to persistence of operant conditioning in animals for some time after a reward stops being given.

Example 2

Virtual Ecology

Figure 4:
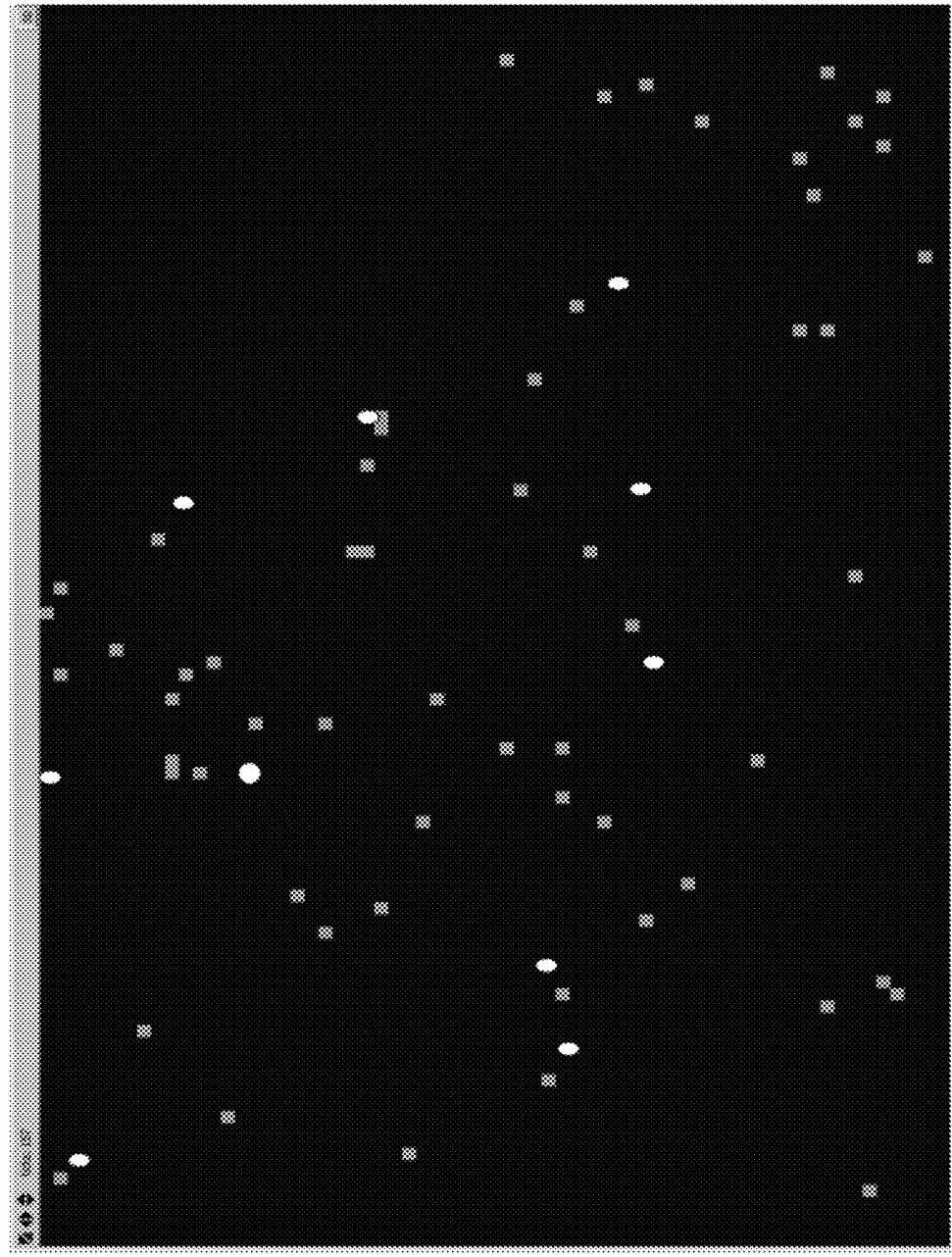
FIG. 4 shows a screenshot from a virtual ecology experiments in which virtual subjects search and compete for resources.
Figure 5:
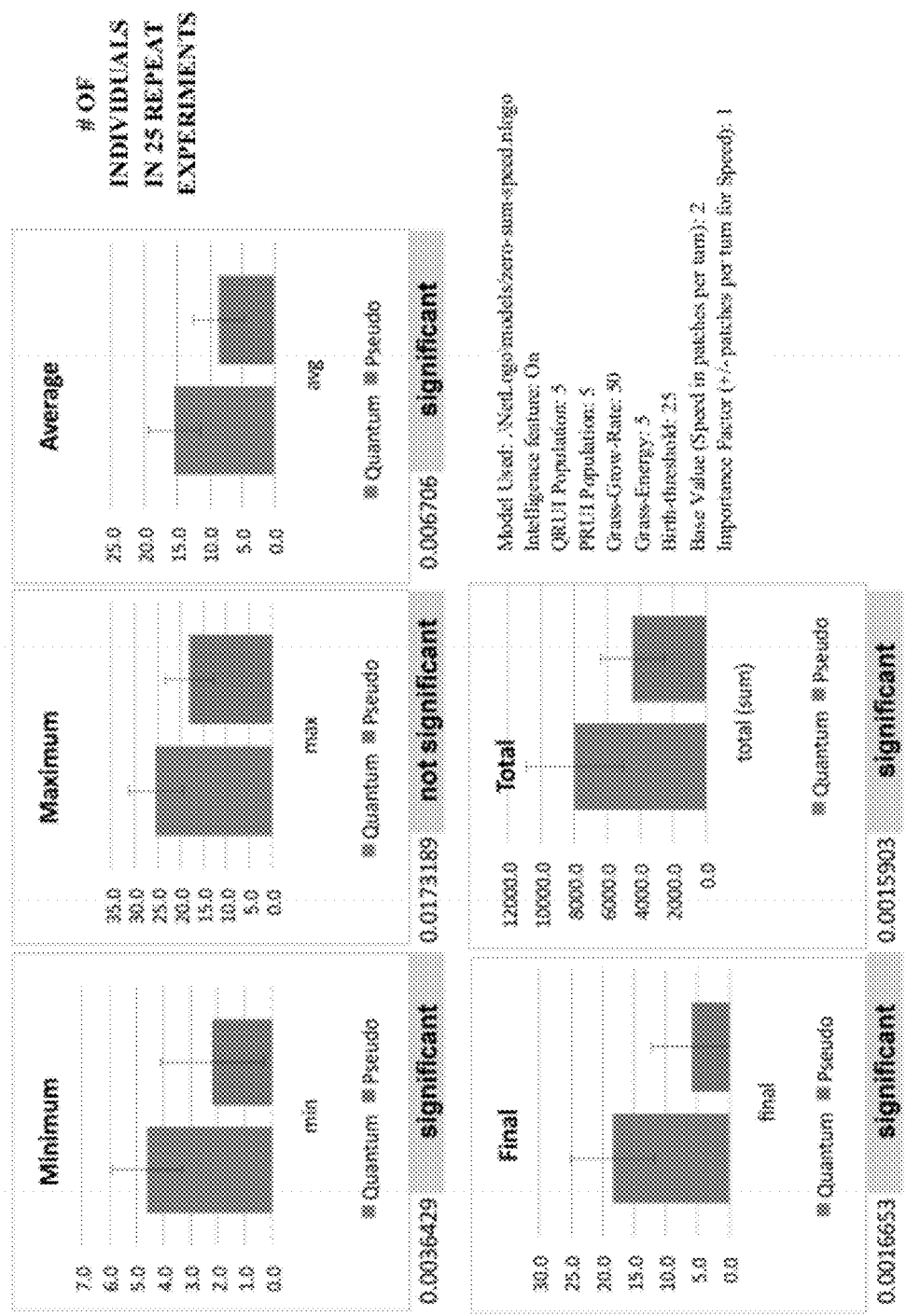
FIGS. 5-7 show histograms demonstrating the improved performance of qRNG subjects over pseudo-RNG subjects in virtual ecology experiments.
Figure 6:
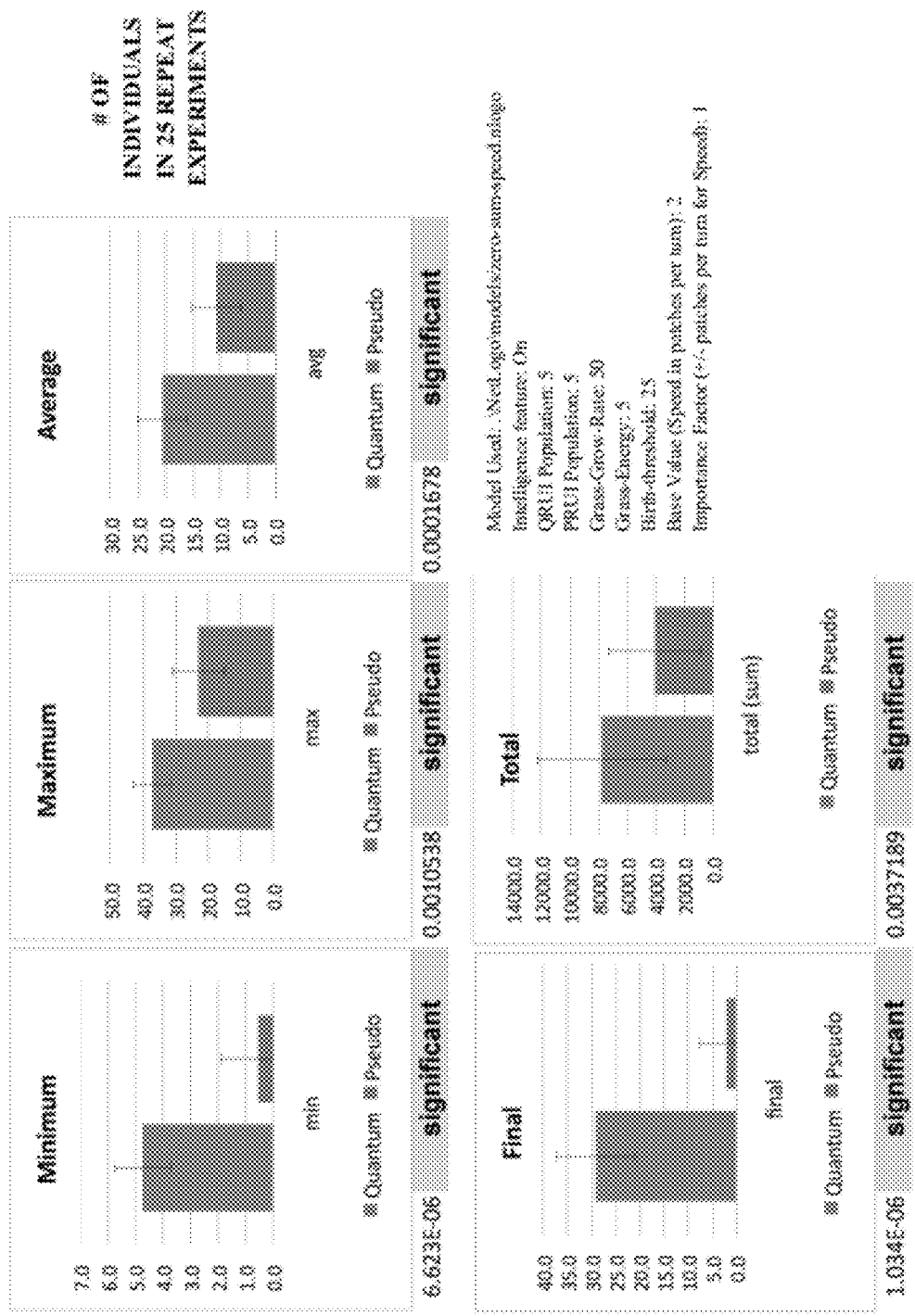
Figure 7:
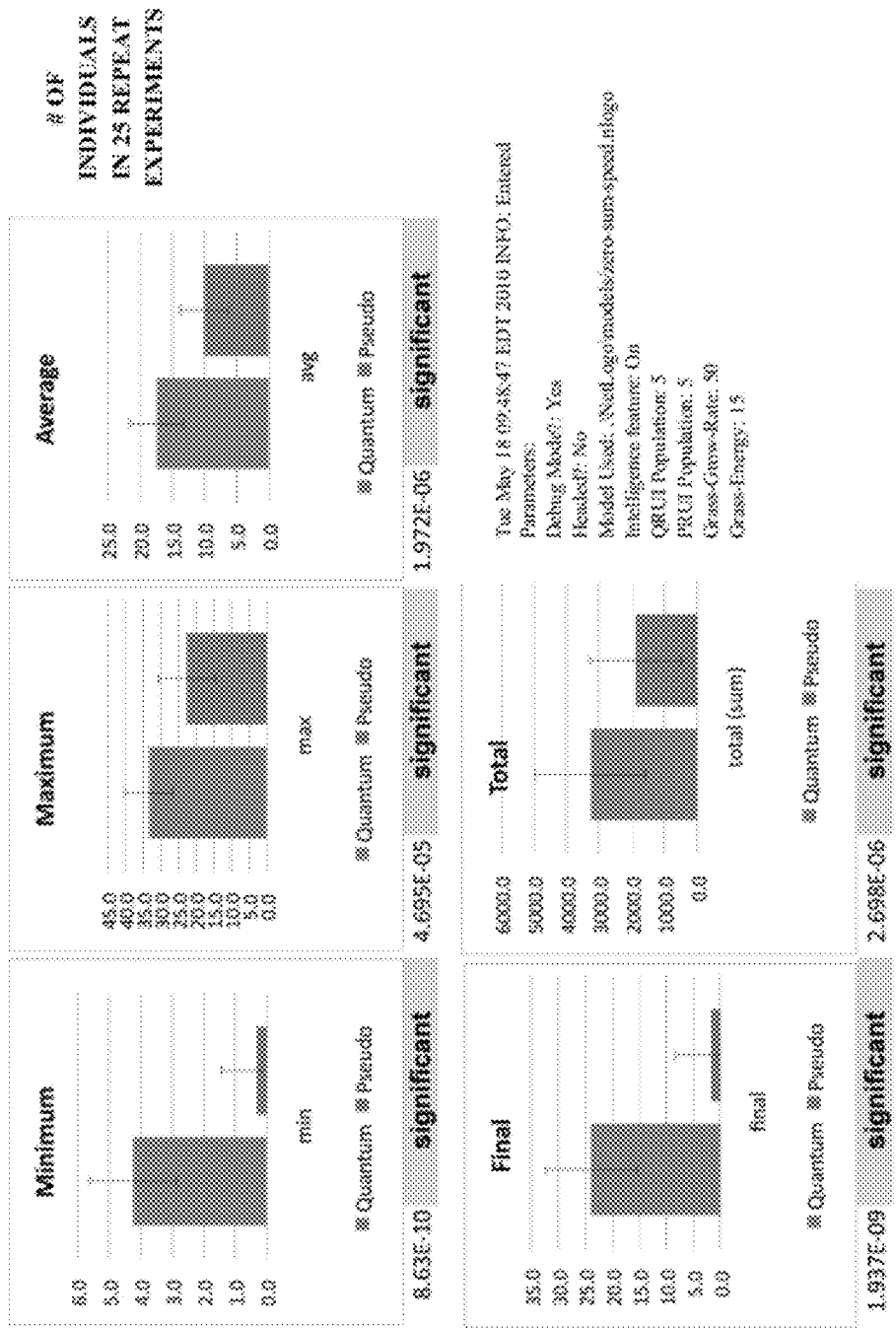

Experiments were conducted during development of embodiments of the present invention using a virtual ecology system in which virtual subjects compete for resources (e.g. grass) (SEE FIG. 4). The speed of movement of the subjects and the distance from which the creatures can observe the resources was controlled by the value of bits being pulled from a random number generator. Virtual subjects either pulled bits from a qRNG or a pseudo-RNG. The qRNG subjects exhibited significantly enhanced performance over those drawing bits from pseudo-RNGs (SEE FIGS. 5-7). In 71% of the experiments run (SEE FIGS. 5-7), one of the subjects died before the end of the experiment due to lack of resources. Of those experiments, the subjects whose speed and observation distance was determined by the pseudo-RNG died out early in 91.1% of the experiments. These data demonstrate a performance advantage obtained through the use of a qRNG to supply bits to an AIA, especially with respect to the Final levels of energy the virtual individuals contained at the end of each run. Further, these results indicate that the subjects in the virtual ecology were capable of exerting influence on the qRNG to supply bits which resulted in optimized performance over the subject drawing bits from the un-influenced pseudo-RNG.

Example 3

Neural Network

Figure 8A:
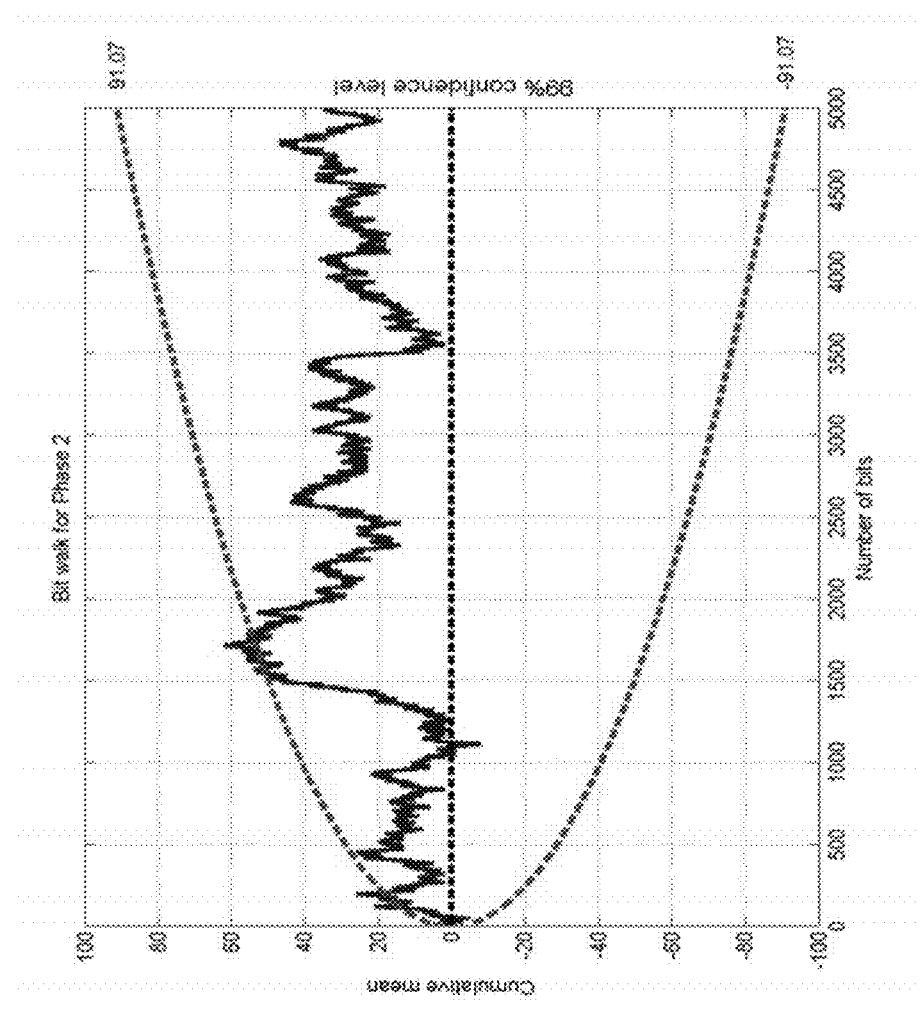
FIG. 8 shows a plot demonstrating self-optimization of a neural network achieved by the network exerting influence upon a qRNG.
Figure 8B:
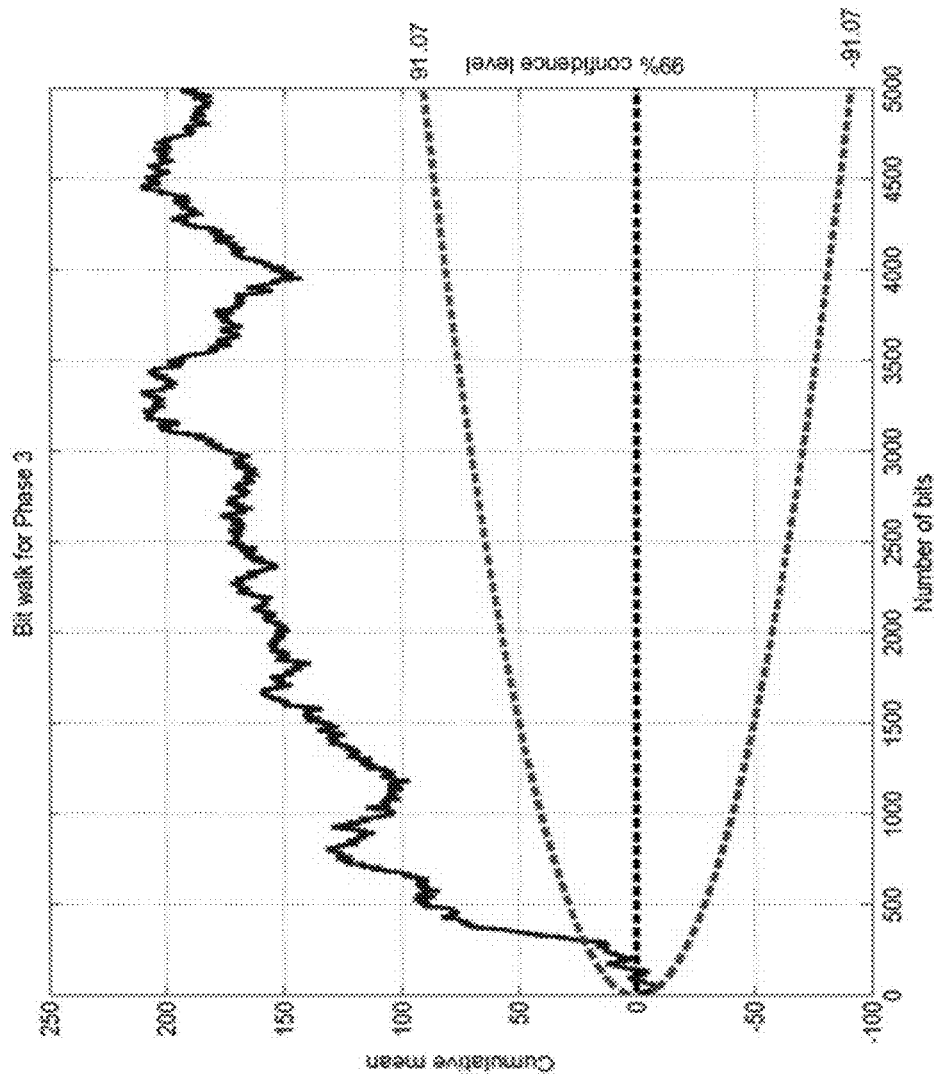

Experiments were conducted during development of embodiments of the present invention using a neural network to sort trained signals. The bits derived from a qRNG (calibrated to provide equal number of good and bad outcomes) determine when the network gets damaged, adversely affecting its performance as its finely-tuned memory gets scrambled. The data stream was monitored over time as bits were collected, but not used by the network (SEE FIG. 8, left panel), and while the bits drawn from the qRNG were used to direct damage of the network (SEE FIG. 8, right panel). The cumulative average is plotted as a function of time resulting in a "bitwalk" plot. During the control (bits not used) phases, the average meanders within an envelope indicating the p=0.01 level of statistical significance (departure from chance behavior). However, when the bits are used to decide whether to damage the network, the bitstream is seen to clearly deviate well outside the p=0.01 "random walk" region, indicating that the Neural Net algorithm exerted an influence upon the qRNG to shift its output from the calibrated 50-50 distribution of bits. By exerting influence upon the qRNG, the neural network algorithm was able to deviate a physical process in accordance with its intent (vis-à-vis how many damages it got).

Example 4

Genetic Algorithm Search

Figure 11A:
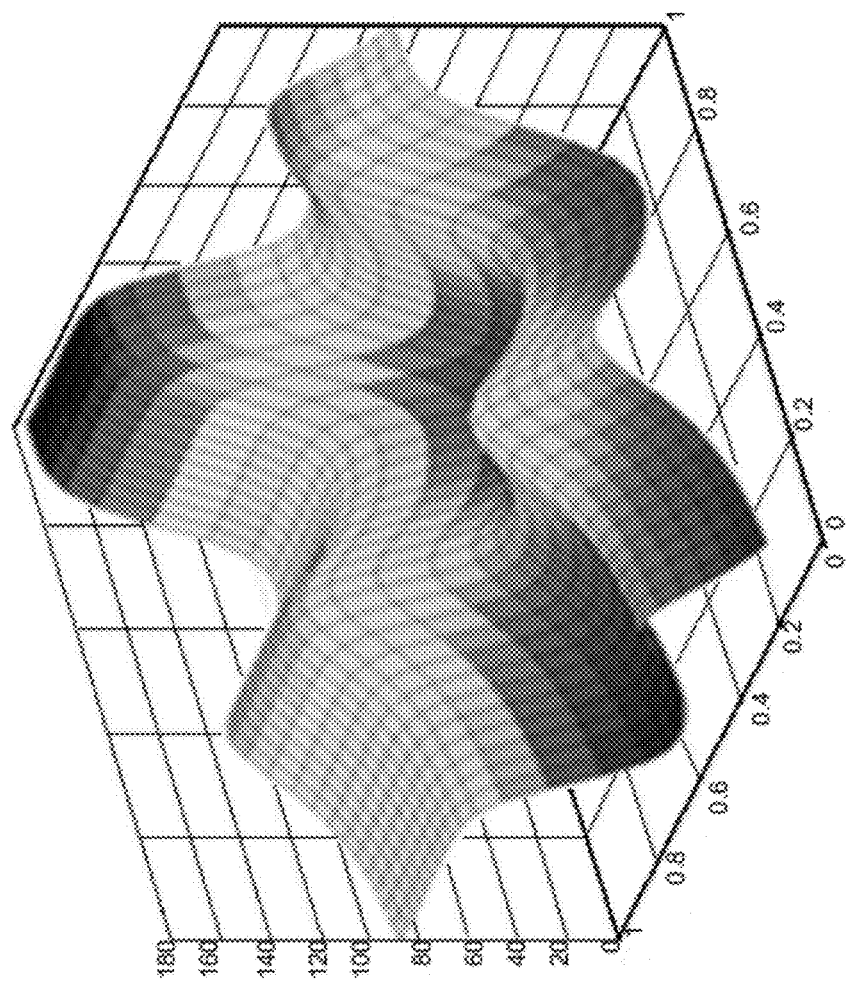
FIG. 11 shows a schematic representation of a genetic algorithm search used to examine the effect of information from a bitstream on a complex process.
Figure 11C:
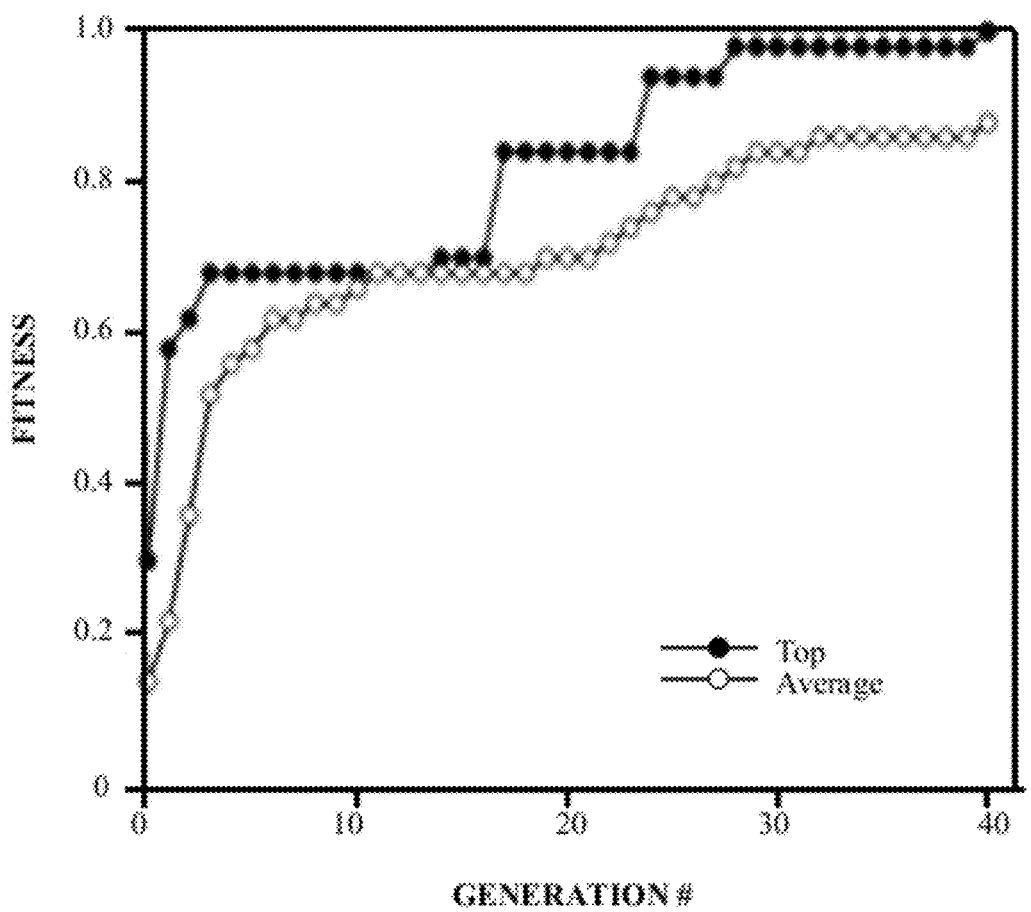
Figure 12B:
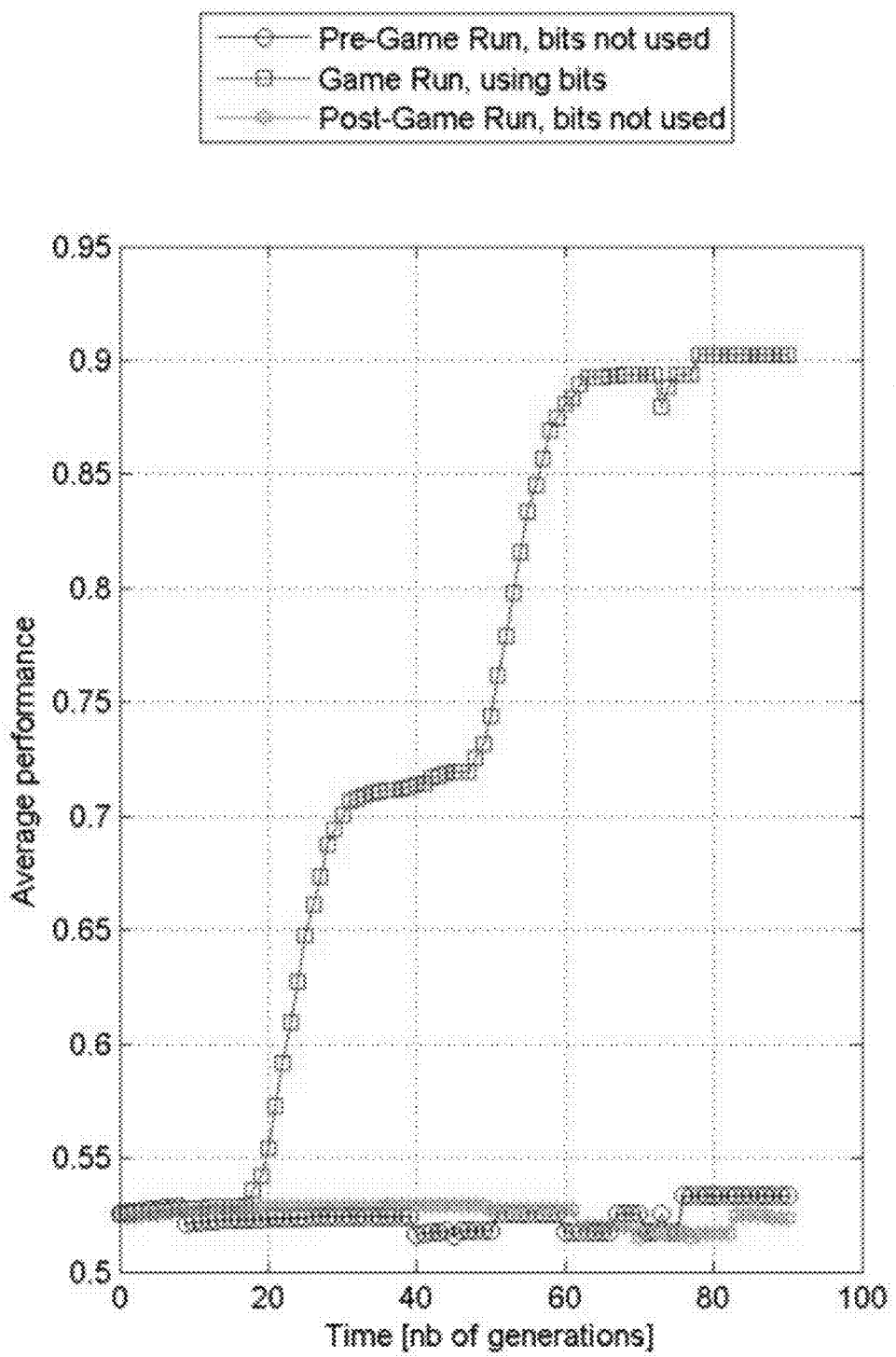
FIG. 12 shows data derived from an experiment in which the performance of a genetic search algorithm is improved through the input of a ritstream from a qRNG.

Experiments were conducted during development of embodiments of the present invention using a genetic algorithm search fitting to a complex 3D surface (SEE FIG. 11). The bits from a qRNG were provided to the algorithm for use in fitting to the complex polynomial. The data performance of the algorithm was monitored over time (1) as bits were collected but not used by the network, (2) while the bits drawn from the qRNG and used to direct the search, and (3) following use of the bits (SEE FIG. 12). The average was plotted as a function of time. Data generated from these experiments indicates that a process, such as a genetic search algorithm, can derive information from a random bitstream, and thereby enhance its performance.

Example 5

Testing Potential AIAs

Experiments have been conducted during development of embodiments of the present invention using several AIAs and potential AIAs to detect the effect of artificial intent exerted on a qRNG. In each case, the test agent performed a task using bits pulled from a bitstream from a qRNG or pseudo random number generator to make a decision of select an outcome. Several systems tested (e.g. chess, evolutionary algorithm, ecological simulator, etc.) have demonstrated the ability to alter the output of a qRNG, thereby demonstrating the intent of these systems. Several systems failed to influence the qRNG (XOR game, LIFE game, etc.), thereby indicating a lack of intent. These data demonstrate the ability of the methods described herein to discriminate between systems capable of exerting influence on a quantum process (intentional systems) an those that are not. Moreover, these results demonstrate that the effect is not the result of experimenter influence.

Example 6

Improved Genetic Algorithm Search

Figure 13A:
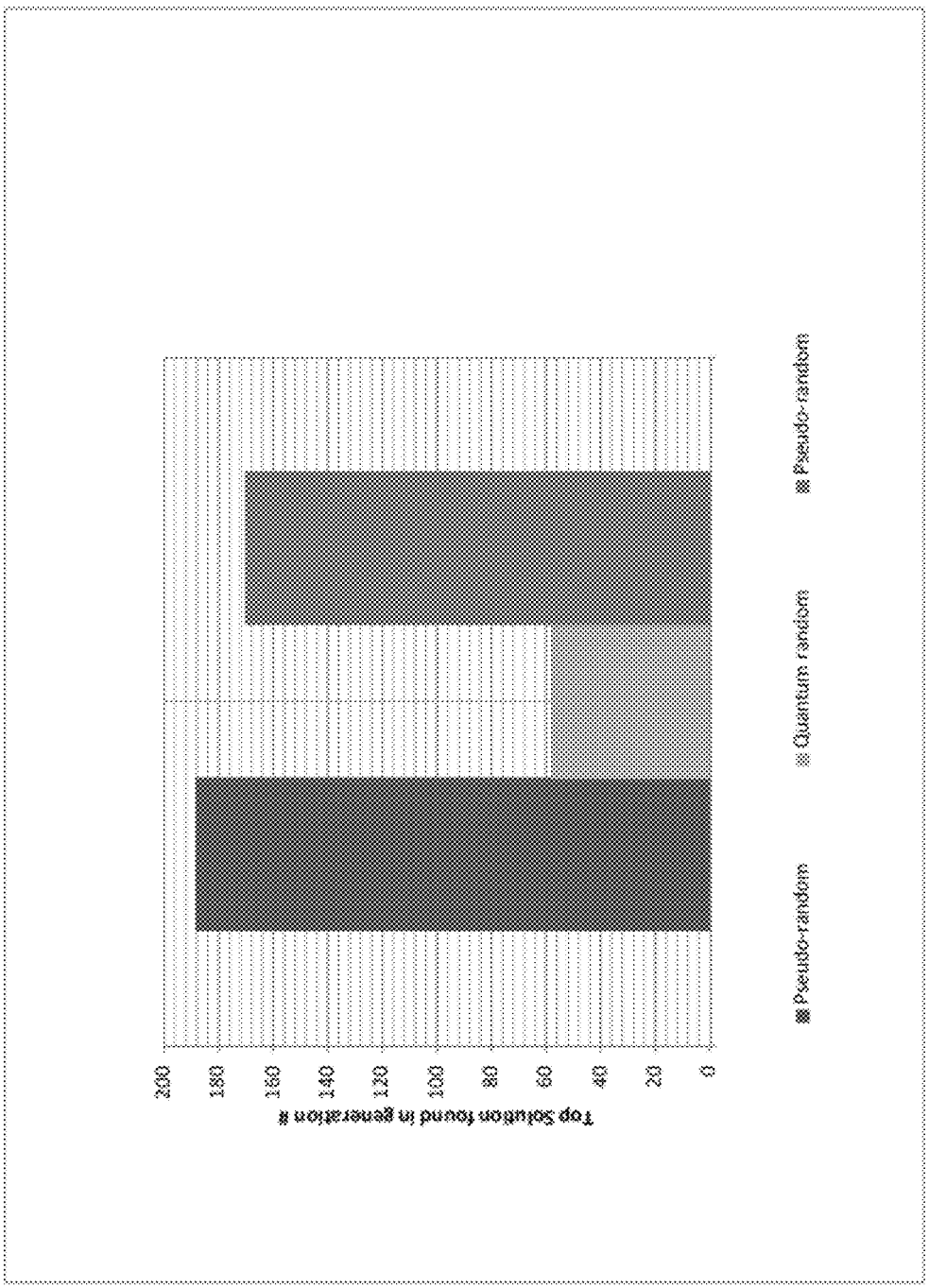
FIG. 13 shows exemplary data from genetic search experiments demonstrating that an optimal solution is reached (A) more quickly and (B) with improved quality.
Figure 13B:
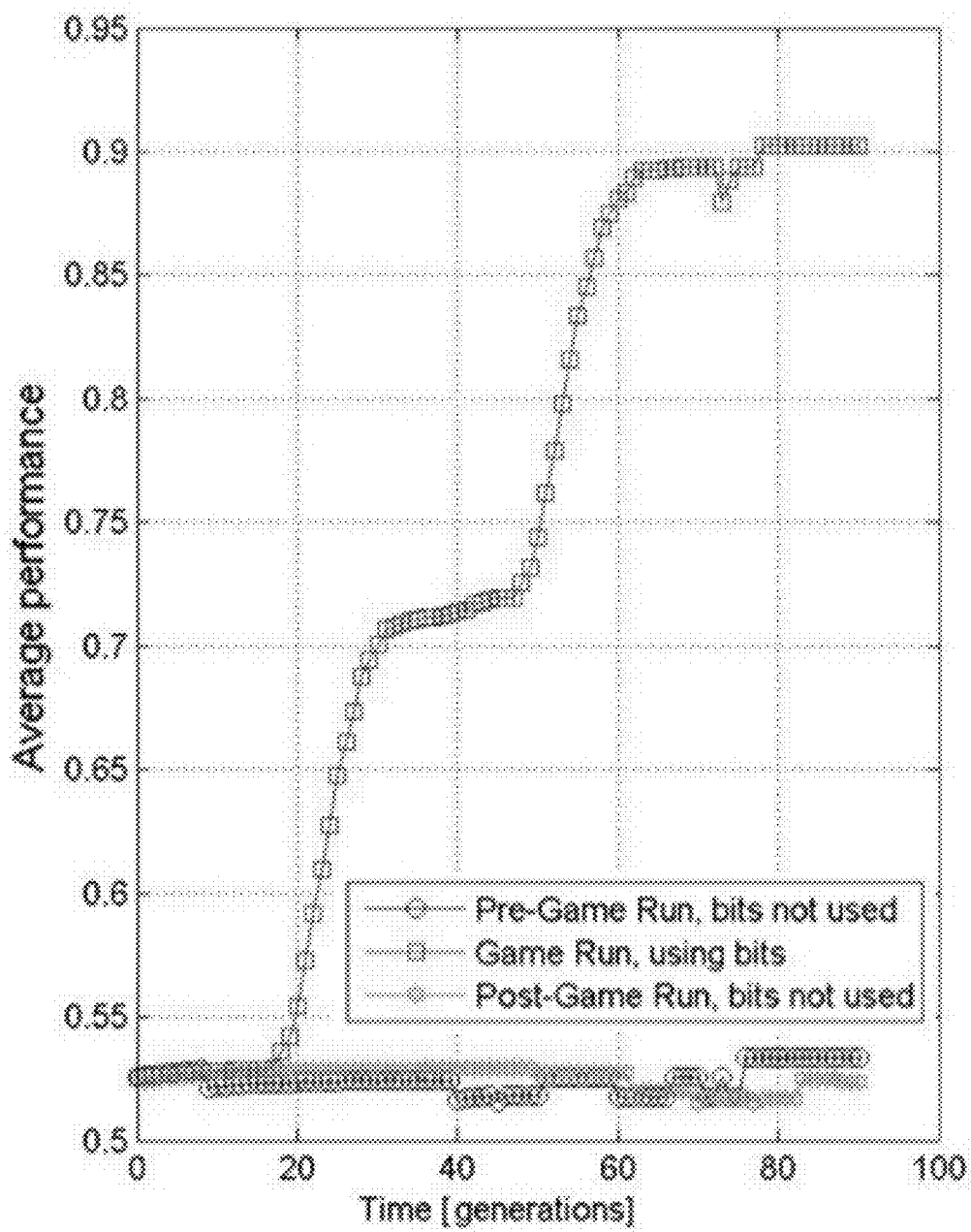

Experiments were conducted during development of embodiments of the present invention that demonstrate use of a qRNG to improve genetic algorithm search. A standard genetic algorithm search was performed to optimize parameters in a curve-fitting task. The locations of random mutations were determined by either a pseudo-random number generator or a qRNG. The optimal locations for mutations are unknown to any search algorithm because it is impossible to know in advance what mutations (what changes to a given individual solution) will give rise to a better solution. The search was performed with 30-50 individuals in each generation, with 10% of the top individuals being mutated and recombined to make each new generation (fitness was defined as the closeness of fit to the target function, computed by the least squares fit method). Up to 1000 generations were conducted. Data collected from the search demonstrate that when using a qRNG to decide where the random mutations should arise in each individual, the optimal solution is found much sooner, as demonstrated by a lower number of generations taken to reach it (SEE FIG. 13A). Tracking the quality of the solutions discovered in any generation (e.g., average across the population) as a function of time demonstrates the superiority of the search process when the mutation decisions are driven by a qRNG rather than a pseudorandom bitstream (SEE FIG. 13B).

Example 7

Improved Decision-Making

Experiments were conducted during development of embodiments of the present invention that demonstrate the use of a qRNG to improve decision-making by an algorithm (e.g., type II "intuition engine" mode). The decision-making game "GO" was used as an exemplary algorithm. Go is an ancient board game for two players that originated in China over 2,000 years ago. The game, which is noted for being rich in strategy despite its relatively simple rules, is played by two players who alternately place black and white stones on the vacant intersections (called "points") of a grid of 19×19 lines. The object of the game is to use one's stones to surround a larger portion of the board than the opponent. Once placed on the board, stones cannot be moved, though they can be removed if they are captured. When a game concludes, the controlled points (territory) are counted along with captured stones to determine who has more points. Games may also be won by resignation. Placing stones close together usually helps them support each other and avoid capture, while placing stones far apart creates influence across more of the board. Part of the strategic difficulty of the game stems from finding a balance between these types of conflicting interests. Players strive to serve both defensive and offensive purposes and choose between tactical urgency and strategic plans. At its basis, the game is one of simple logic, while in advanced play the game involves complex heuristics and tactical analysis.

According to the algorithm, the quality of all possible choices (or "moves") are ranked according to the predicted quality of the choice. When top choices (e.g., the top two choices) had the same predicted quality, a random number from a qRNG or pseudo random number was used to decide between the choices. 500 games of GO were played and the quantum random bits or pseudo-random bits were used to decide between the top two moves whenever they had the same predicted quality value ("intuition" mode). The bitstreams concatenated from all games were analyzed by the ENT package from Fourmilab (http://www.fourmilab.ch/random/), a standard tool for detecting abnormalities in random number generator data. The average chi-square analysis for the bits obtained from the pseudo-random number generator was 25.0%—the expected chance expectation. However, when using a qRNG, which is otherwise calibrated to pass the ENT randomness tests, the chi-squared test reported a probability of 0.869% for the bit string—well below a $p<5\%$ significance level.

When 200 games of GO were played and random or pseudo-random bits were used to decide between the top two moves whenever they had the same predicted quality. The entropy of the quantum and pseudorandom streams was significantly different (See Table 1)

TABLE 1

| | Pseudorandom | Quantum random | # of pseudo bits | # of quantum bits |
| --- | --- | --- | --- | --- |
| Average | 0.96 | 0.98 | 125.90 | 125.92 |
| Standard Deviation | 0.04 | 0.02 | 17.30 | 17.91 |

These results demonstrate the ability of a AIA (computer algorithm) to deviate the output of a quantum process (i.e., the quantum process underlying a qRNG). That the output of the pseudo random number generator was unaffected by the algorithms intent serves as a control.

Example 8

The Effect of Intent by a Simulated Population on a Quantum Process

Figure 14A:
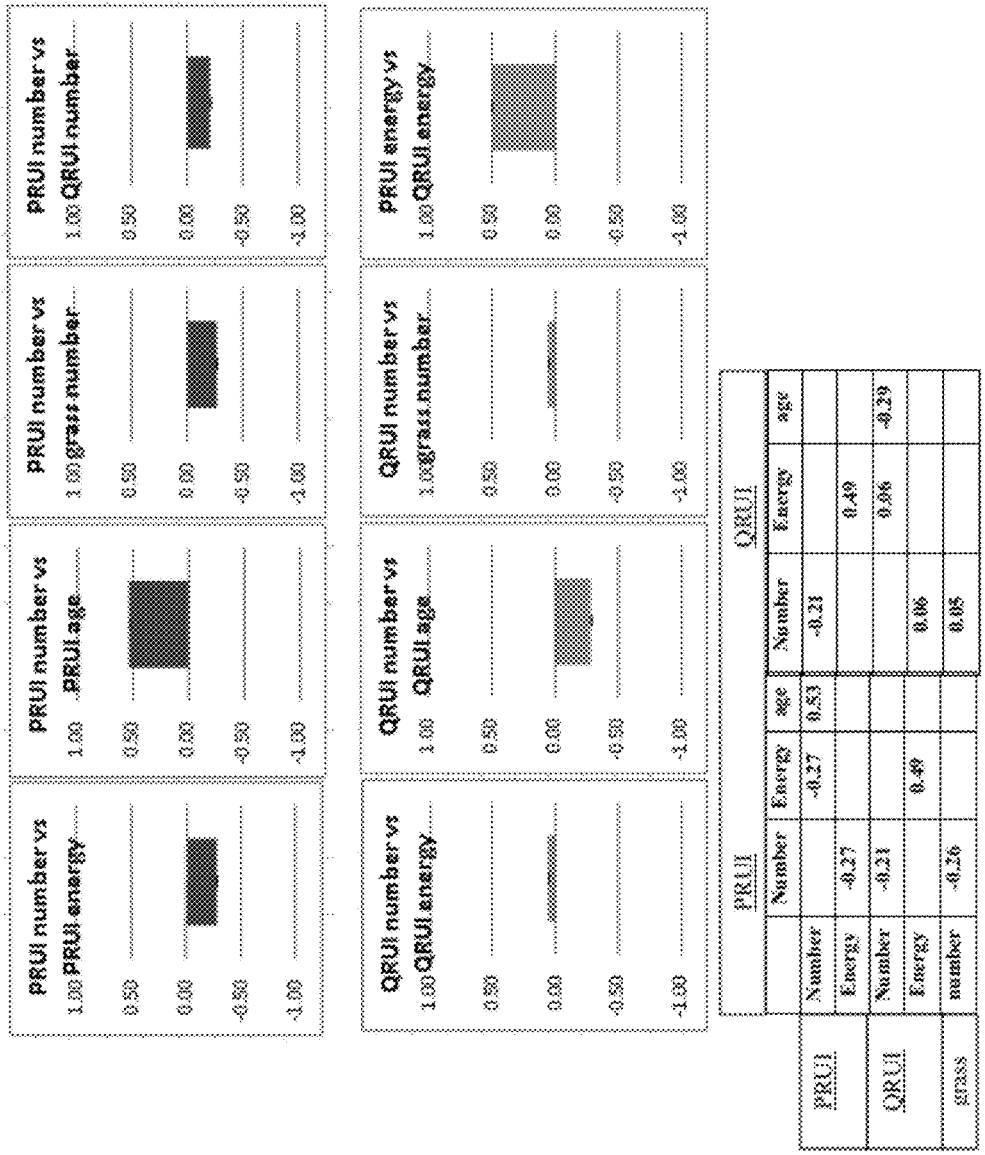
FIG. 14 shows exemplary data from simulated population experiments demonstrating deviated results between populations dependent upon quantum and pseudo-random bits.
Figure 14:
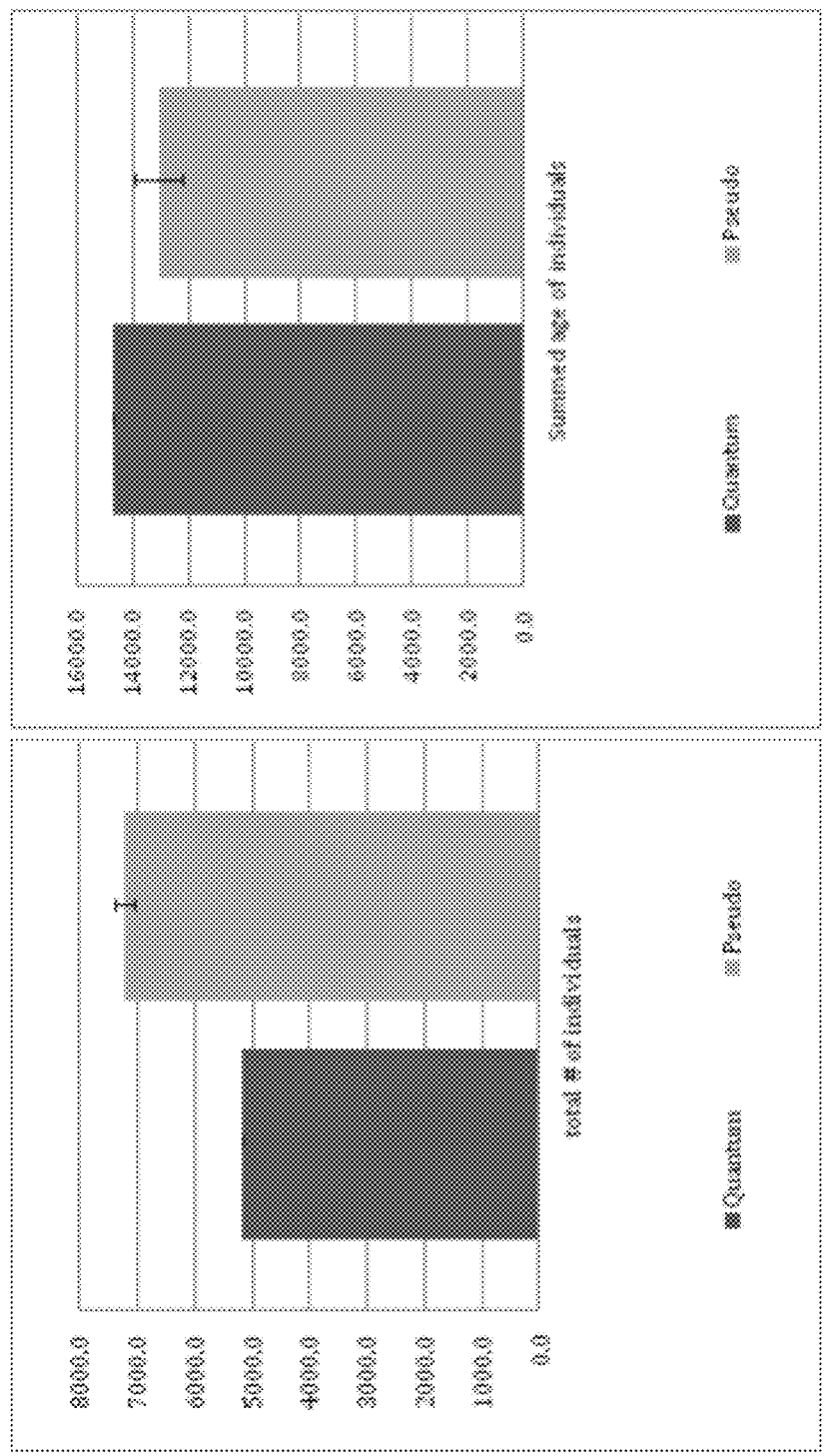

A virtual ecology was programmed with two types of individuals: pseudo-random using individuals (PRUIs) and quantum random using individuals (QRUIs). The individuals traverse a virtual world and compete for virtual grass, which grows at a given rate. The PRUIs/QRUIs starved (died) if they did not eat enough, and they multiplied (split into two) if they ate above a threshold value. With each tick of the world's clock, each individual grabbed a bit from either a pseudorandom generator (e.g., rand( ) function), or from a USB-based hardware qRNG. The correlations among the different parameters in the simulator were then analyzed. Even though both generators meet the accepted criteria for random number sources, the data clearly show that dynamical simulations whose evolution depends on a quantum number generator are statistically significantly deviated to result in very different dynamics (correlations between measured quantities in the system) than those relying on a deterministic data stream (pseudo-random number) (SEE FIG. 14). At the end of the simulation, the qRNG-using individuals were less numerous, but older. Thus indicating that the QRUI's were able to obtain enough food to stay alive, but not enough food to reproduce. However, because the PRUI's obtained enough food to reproduce, their offspring competed with them for resources, resulting in earlier deaths. These data indicate that the intent of the QRUI's to stay alive affected the bits drawn from the qRNG to provide results that would optimally prolong the life of the QRUI's (e.g., sufficient food to live, but not enough to frequently reproduce).

Example 9

The Effect of Genetic Algorithm Search Processes on Quantum-Based Events

Figure 15:
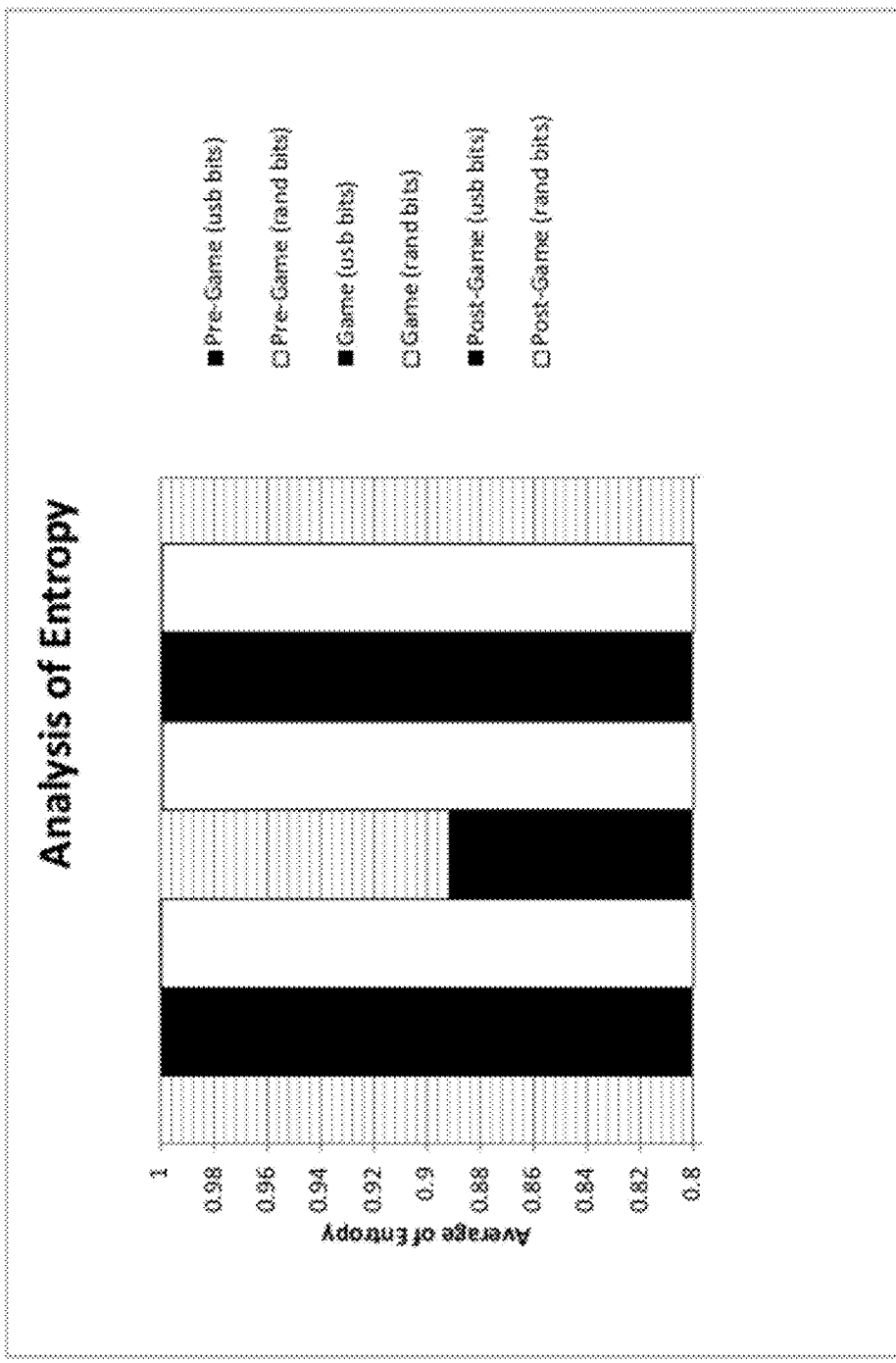
FIG. 15 shows an analysis of the entropy from different portions of a genetic search process (e.g., before, during, or after the search) in which bits were either drawn from a qRNG (USB bits) or from a pseudo random number generator (rand bits).
Figure 16:
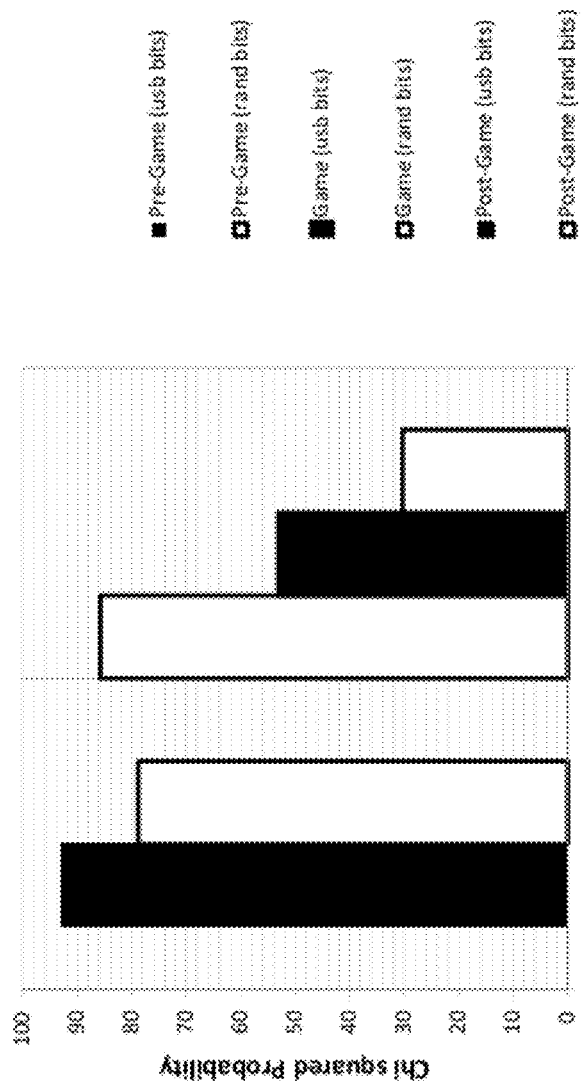
FIG. 16 shows an analysis of the Chi square probability from different portions of a genetic search process (e.g., before, during, or after the search) in which bits were either drawn from a qRNG (USB bits) or from a pseudo random number generator (rand bits).
Figure 17:
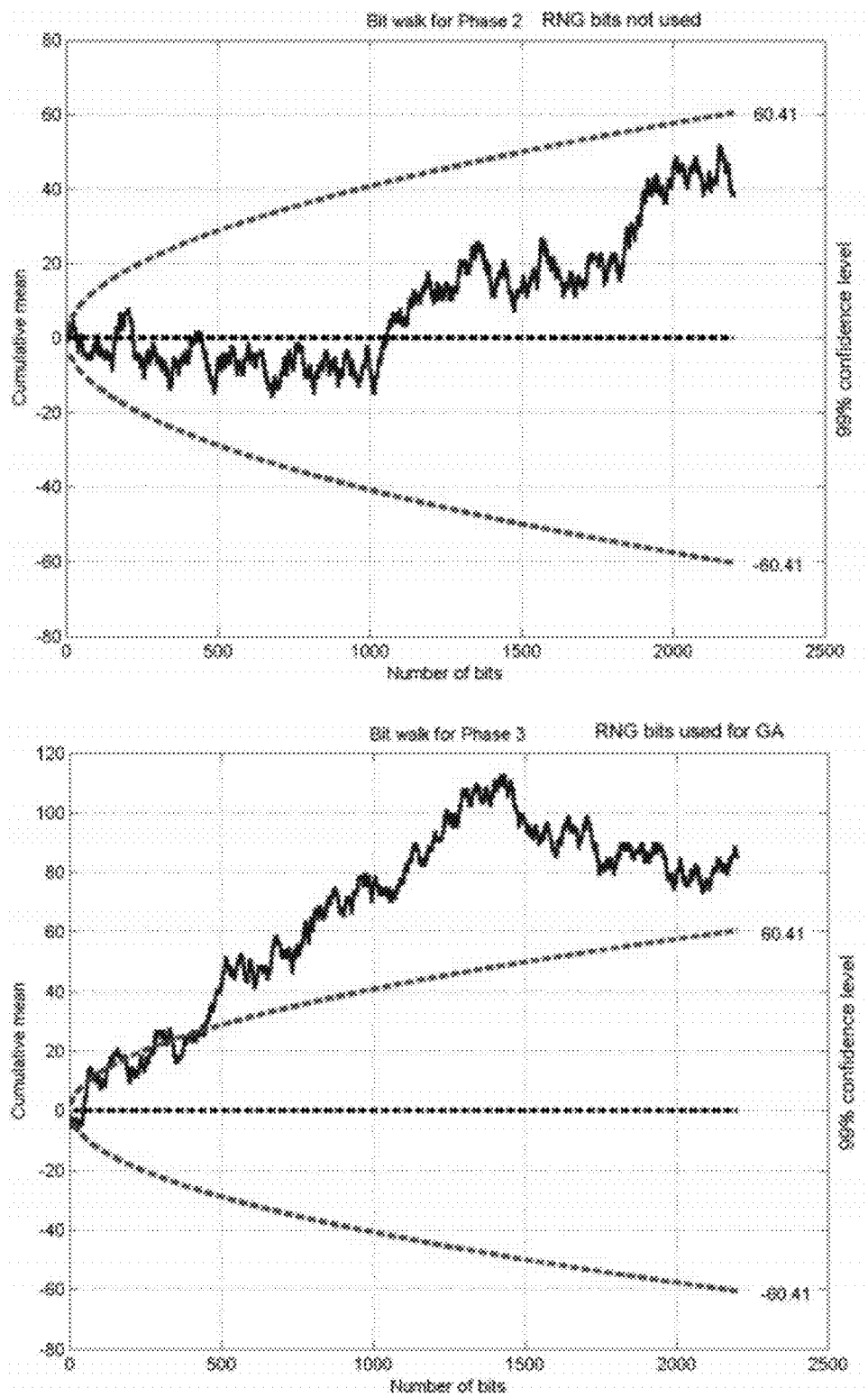
FIG. 17 shows the moving average of a bitstream from a qRNG before and during a genetic search process, relative to an envelope indicating probability at the p=0.01 level. The cumulative mean of the bits begins to deviate at the point in which the bits become determinative of the search outcome.

Experiments conducted during development of embodiments of the present invention demonstrate the alteration of quantum-based events by genetic algorithm search processes. A standard genetic algorithm search was performed to optimize parameters in a curve-fitting task. Each individual in the population encoded a possible polynomial (each gene specified the factor for each power of the variable); the quality (fitness) of each individual is how closely that individual resembles the target curve being fitted. This is a complex task, as it is difficult to find a curve that fits well to a pre-defined polynomial surface. The bits were used to determine where (and how) to make mutations in each individual, when repopulating each new generation from the top 10% of performers in the previous generation. The bit streams during pre-game and post-game phases (when bits are collected but not used for anything), and for pseudo-random vs. quantum-random streams, were analyzed with the ENT package from Fourmilab (http://www.fourmilab.ch/random/). Only the quantum-random bits, and only when those bits are actually used for making decisions in the genetic algorithm search (e.g., decisions about where to mutate), are altered in such a way that the overall compressibility (e.g., non-randomness, entropy) of the stream is significantly different from the expected 1.0 (SEE FIG. 15). The same holds true for the chi-squared probability of the stream (from a different experiment) in which only the game bits have a probability p<1% (SEE FIG. 16). The same effect is observed by tracking the moving average of the bitstream (relative to an envelope indicating probability at the p=0.01 level). The genetic algorithm process deviates the output of the quantum generator to a statistically-significant effect, but only when the generator's bits are actually being used to direct the mutations of the GA search (SEE FIG. 17).

Example 10

Effect of an Artificial Neural Network on Quantum Based Events

Figure 18A:
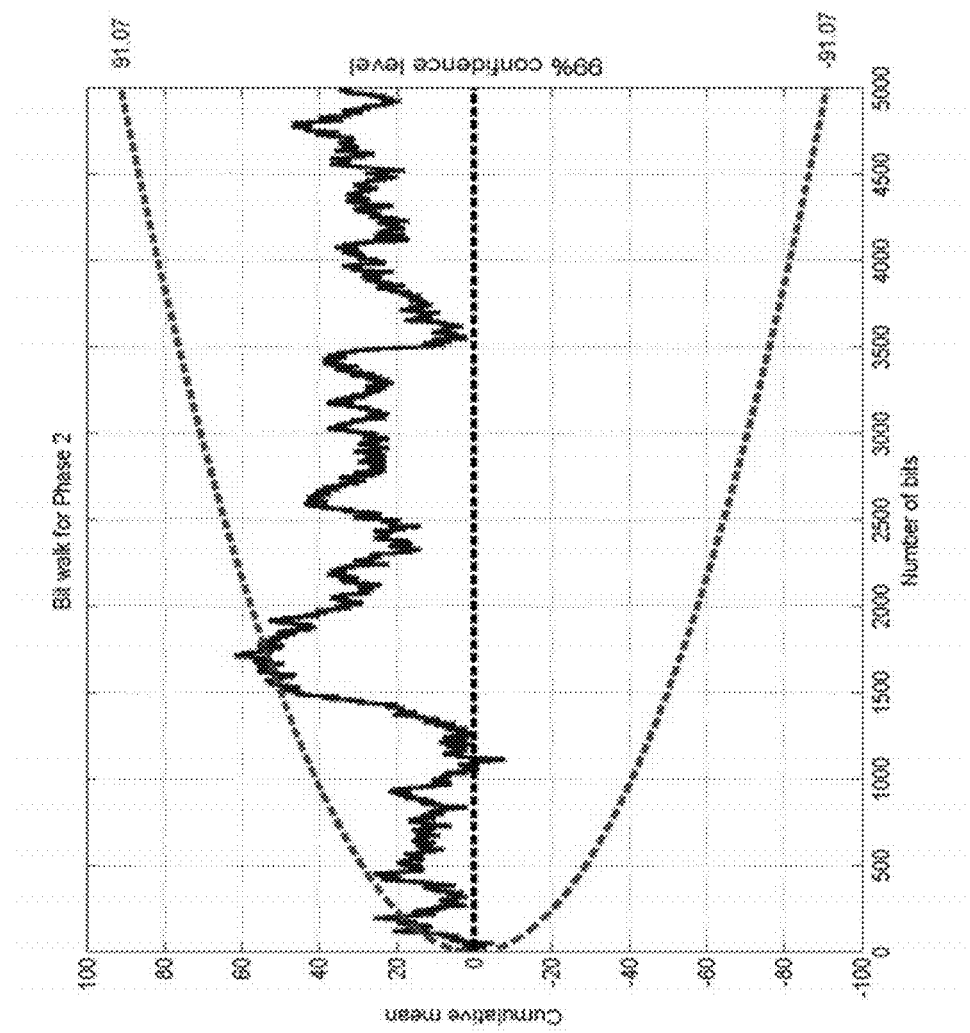
FIG. 18 shows a graph demonstrating the alteration of the moving average of a bitstream from a qRNG by a neural network.

Experiments conducted during development of embodiments of the present invention demonstrate the alteration of quantum-based events by an artificial neural network. An artificial neural net was trained to sort signals into two categories (recognition task). Every few ticks of the clock, the net was damaged (or not) based on the output of a number generator (either a qRNG or pseudo-random number generator). By tracking the moving average of the bitstream (relative to an envelope indicating probability at the p=0.01 level), it is seen that the neural network is able to deviate the output of the quantum generator (i.e. the input of the neural network) but not a pseudorandom number generator to a statistically-significant effect (SEE FIG. 18).

Example 11

Deviation of a Bitstream by a Cognitive Agent

Figure 19:
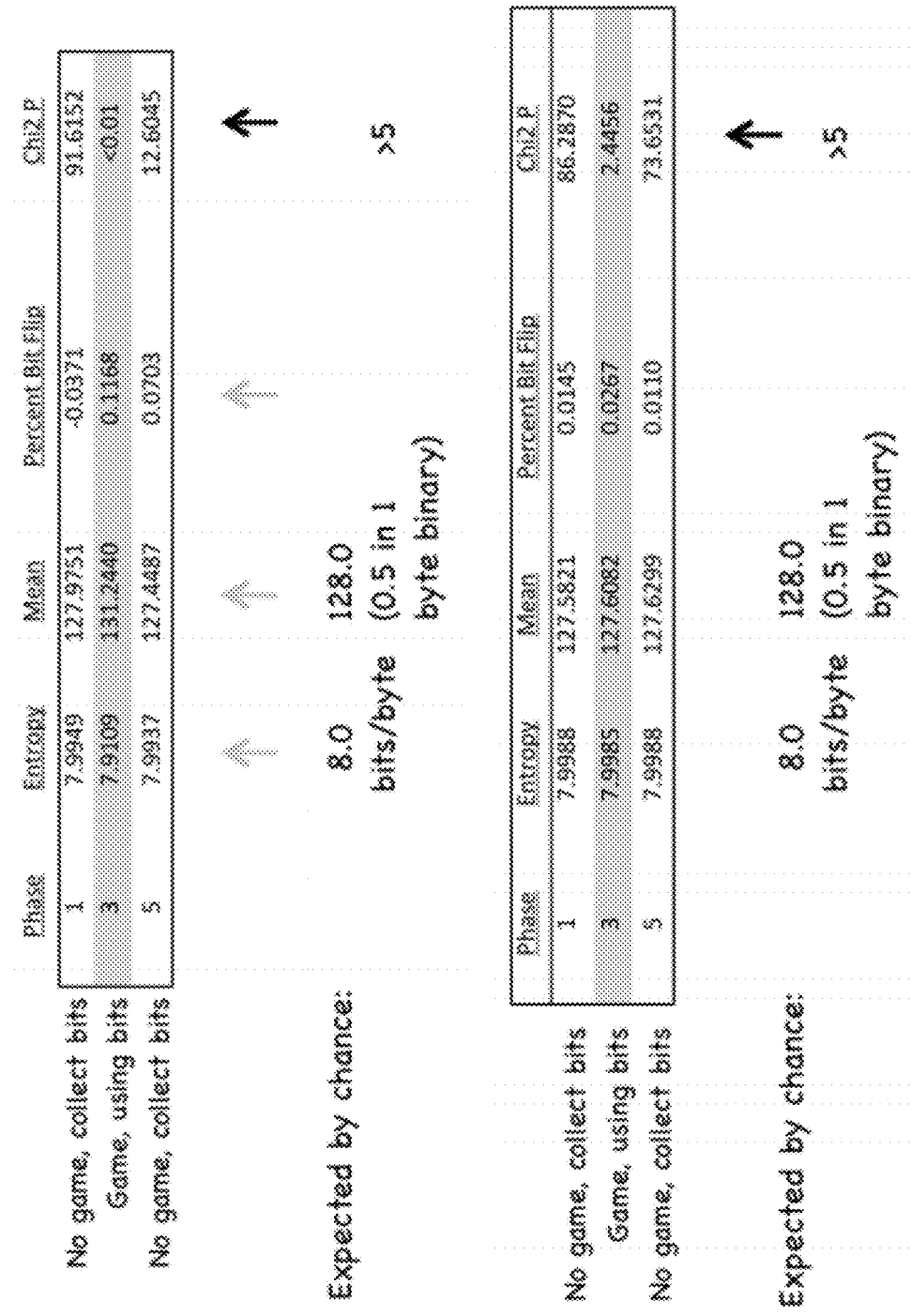
FIG. 19 shows a statistical analysis of the results of (a) a neural-net based chess playing algorithm and (b) a table-lookup chess playing algorithm utilizing a quantum bitstream as input.

Experiments were conducted during development of embodiments of the present invention to demonstrate the ability of a cognitive agent to deviate bitstream. For example, a computer chess game was used in which, prior to each turn of a computer player, the available moves were ranked according to a chess-playing algorithm. Upon ranking the available moves, a bit (e.g., 1 or 0) was gathered from a quantum generator. If the bit was a 1, the computer player was allowed to use its best next move; if the bit was a 0, the computer player had to use an inferior move. Differences in statistical analysis of the bitstream are revealed in entropy (compressibility), bit average (mean), and probability of sequence observed (chi-squared value) (SEE FIG. 19). Despite being otherwise calibrated to produce an equal number of 1's and 0's, when being actively used to determine the outcome for a cognitive agent, the bitstream was deviated by the intent of the agent toward the agent's goal (e.g., more 1's to produce better chess results). These data demonstrate that when a bitstream is being used to impact the actions of a goal-seeking cognitive agent, that agent exerts a statistically measurable influence on the quantum process generating the stream.

REFERENCES

Churchland, P., 1988. Matter & Consciousness. M I T Press.
Davis, L., Handbook of Genetic Algorithms. Van Nostrand, New York.
Davis, M., 1965. The undecidable; basic papers on undecidable propositions, unsolvable problems and computable functions. Raven Press, Hewlett, N.Y.
Dennett, D., 1987. The intentional stance. MIT Press, Cambridge, Mass.
Dennett, D. C., 1996. Kinds of minds: toward an understanding of consciousness. BasicBooks, New York, N.Y.
Franklin, M., et al., The Effects of Genetically Healthy and Weakened Caenorhabditis elegans on a Field Random Event Generator (REG). ICRL, 2005.
Franklin, M., Kendall, E., Vassilieva, L., 2005. The Effects of Genetically Healthy and Weakened Caenorhabditis elegans on a Field Random Event Generator (REG). ICRL.
Furuhashi, T., 1995. Advances in fuzzy logic, neural networks, and genetic algorithms: IEEE/Nagoya-University World Wisepersons Workshop, Nagoya, Japan, Aug. 9-10, 1994: selected papers. Springer, Berlin; New York.

Hameroff, S., 1987. Ultimate Computing: Biomolecular Consciousness & Nanotechnology. Elsevier Science.

Herman, G. T., Walker, A., 1972. The syntactic inference problem as applied to biological systems, in: Meltzer, B., Michie, D. (Eds.), Machine Intelligence. Edinburgh University Press, Edinburgh.

Hodgson, D., 1991. The mind matters: consciousness and choice in a quantum world. Clarendon Press; Oxford University Press, Oxford, New York.

Hofstadter, D., Dennett, D., 1981. The Mind's I. Basic Books.

Jahn, R. G., Dunne, B. J., 1987. Margins of reality: the role of consciousness in the physical world. Harcourt Brace Jovanovich, San Diego.

Jahn, R. G., Dunne, B. J., 1986. On the Quantum-Mechanics of Consciousness, with Application to Anomalous Phenomena. Foundations of Physics 16, 721-772.

Jahn, R. G., Dunne, B. J., Nelson, R. D., Dobyns, Y. H., Bradish, G. J., 1997. Correlations of random binary sequences with pre-stated operator intention: a review of a 12-year program. Journal of Scientific Exploration 11, 345-367.

Jibu, M., Yasue, K., 1995. Quantum Brain Dynamics & Consciousness: An Introduction. John Benjamins North America, Incorporated.

Koza, J. R., 1992. Genetic programming: on the programming of computers by means of natural selection. MIT Press, Cambridge, Mass.

Koza, J. R., 1999. Genetic programming III: darwinian invention and problem solving. Morgan Kaufmann, San Francisco.

Krippner, S., Carlson, M. C., 1979. Psychoenergetic systems: the interaction of consciousness, energy, and matter. Gordon and Breach Science Publishers, New York.

Langton, C. G., 1989. Artificial life: the proceedings of an Interdisciplinary Workshop on the Synthesis and Simulation of Living Systems, held September, 1987 in Los Alamos, N. Mex. Addison-Wesley, Redwood City, Calif.

Langton, C. G., 1992. Artificial life II: proceedings of the workshop on artificial life held February, 1990 in Santa Fe, N. Mex. Addison-Wesley, Redwood City, Calif.

Langton, C. G., 1995. Artificial life: an overview. MIT Press, Cambridge, Mass.

Larmer, R., 1986. Mind-body interaction and the conservation of energy. International Philosophical Quarterly. 26, 277-285.

Levin, M., 2000. What is the Fundamental Nature of Consciousness? International Journal of Parapsychology. 11, 123-141.

Lucas, J. R., 1961. Minds, Machines and Gödel. Philosophy. XXXVI, 112-127.

Lycan, W. G., 1999. Mind and cognition: an anthology. Blackwell Publishers, Malden, Mass.

McDonnell, M. D., Abbott, D., 2009. What is stochastic resonance? Definitions, misconceptions, debates, and its relevance to biology. PLoS Comput Biol 5, e1000348.

Mehrotra, K., et al., 1996. Elements of artificial neural networks. MIT Press, Cambridge, Mass.

Mino, H., Durand, D. M., 2008. Stochastic resonance can induce oscillation in a recurrent Hodgkin-Huxley neuron model with added Gaussian noise. Conf Proc IEEE Eng Med Biol Soc 2008, 2457-2460.

Morowitz, H., 1987. The mind body problem and the second law of thermodynamics. Biology and Philosophy. 2, 271-275.

Oviedo, N. J., Nicolas, C. L., Adams, D. S., Levin, M., 2008. Live Imaging of Planarian Membrane Potential Using DiBAC4(3). Cold Spring Harb Protoc 2008, pdb.prot5055-.

Penrose, R., 1991. The emperor's new mind: concerning computers, minds, and the laws of physics. Penguin Books, New York, N.Y., U.S.A.

Penrose, R., 1996. Shadows of the Mind: A Search for the Missing Science of Consciousness. Oxford University Press, Oxford.

Peoch, R., 1988. Chicken imprinting and the tychoscope: An anpsi experiment. JSPR 55, 1-9.

Peoch, R., 1995. Psychokinetic action of young chicks on the path of an illuminated source. Journal of Scientific Exploration 9, 223.

Roberts, F. S., 1990. The missing factor in thinking supercomputers. Journal of the Society for Psychical Research. 56, 300-305.

Schmidt, H., 1971. Mental Influence on Random Events. New Sci and Sci J, 757-768.

Schwartz, J. M., Stapp, H. P., Beauregard, M., 2005. Quantum physics in neuroscience and psychology: a neurophysical model of mind-brain interaction. Philosophical transactions of the Royal Society of London 360, 1309-1327.

Searle, J., 1985. Minds, Brains & Science. Harvard University Press.

Squires, E. J., 1990. Conscious mind in the physical world. Adam Hilger, Bristol; New York.

Stapp, H., 1993. Mind, matter, and quantum mechanics. Springer-Verlag, New York.

Stapp, H. P., 1999. Attention, intention, and will in quantum physics. Journal of Consciousness Studies 6, 143-164.

Steels, L., Brooks, R. A., 1995. The artificial life route to artificial intelligence: building embodied, situated agents. L. Erlbaum Associates, Hillsdale, N.J.

Turing, A., 1950. Computing machinery and intelligence. Mind. 59, 433-460.

Zohar, D., Marshall, I. N., 1990. The quantum self: a revolutionary view of human nature and consciousness rooted in the new physics. Bloomsbury, London.

All publications and patents listed above and/or provided herein are incorporated by reference in their entireties. Various modifications and variations of the described compositions and methods of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the present invention.

I claim:

1. A computer program product comprising a non-transitory computer readable storage medium storing computer usable program code executable to perform operations for evaluating an influence of an artificial intelligence agent on a quantum process, the operations comprising:

a) receiving a quantum bitstream indicative of the quantum process, wherein the quantum bitstream includes two or more bit patterns;

b) ranking a list of two or more tasks based on an algorithmically-predicted quality of each of the two or more tasks to determine a higher-ranked task and a lower-ranked task;

c) associating the higher-ranked task with a first one of the two or more bit patterns;

d) associating the lower-ranked task with a second one of the two or more bit patterns;
e) performing the higher-ranked task for each occurrence of the first bit pattern in the quantum bitstream;
f) performing the lower-ranked task for each occurrence of the second bit pattern in the quantum bitstream;
g) generating a pseudo-random bitstream comprising two or more bit patterns;
h) repeating steps c-f using the pseudo-random bitstream; and
i) determining a difference of an entropy of the quantum bitstream and an entropy of the pseudo-random bitstream.

2. The computer program product of claim 1, wherein the operations further comprise presenting an output of the quantum bitstream and an output of the pseudo-random bitstream to the artificial intelligence agent.

3. The computer program product of claim 1, wherein the operation of receiving the quantum bitstream comprises receiving a bitstream from a quantum random number generator configured to convert electrical signals indicative of a quantum process to a corresponding bit pattern of the two or more bit patterns.

* * * * *